May 9, 1950 F. M. BURELBACH ET AL 2,506,949
GROUND TRAINER FOR TRAINING AIRCRAFT CREW MEMBERS
Filed June 25, 1946 9 Sheets-Sheet 1

INVENTORS. F. M. BURELBACH
J. J. LUKACS
BY P. C. Smith
ATTORNEY

INVENTORS: F. M. BURELBACH
J. J. LUKACS
BY P. C. Smith
ATTORNEY

May 9, 1950     F. M. BURELBACH ET AL     2,506,949
GROUND TRAINER FOR TRAINING AIRCRAFT CREW MEMBERS
Filed June 25, 1946     9 Sheets-Sheet 7

INVENTORS: F. M. BURELBACH
J. J. LUKACS
BY P. C. Smith
ATTORNEY

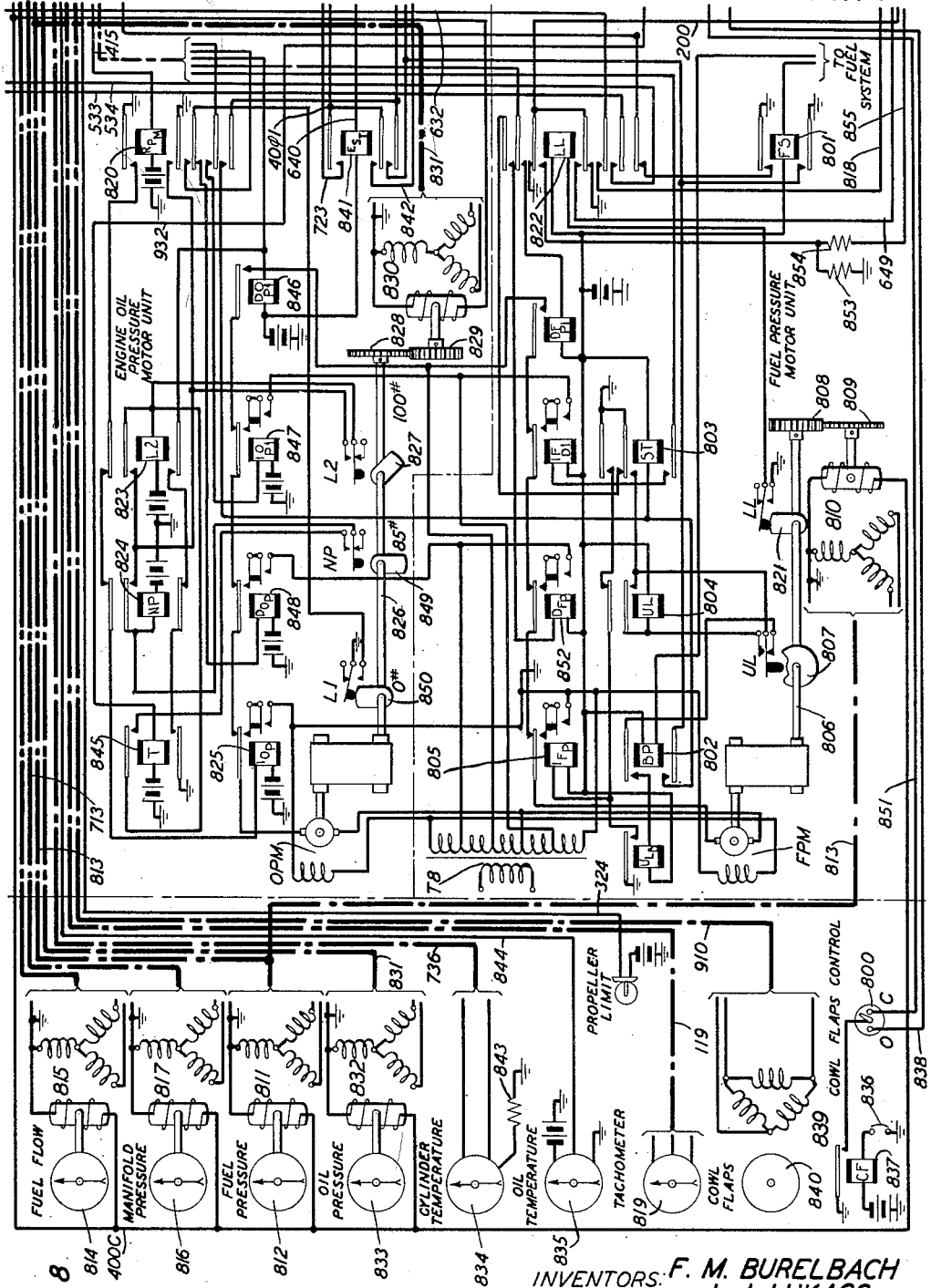

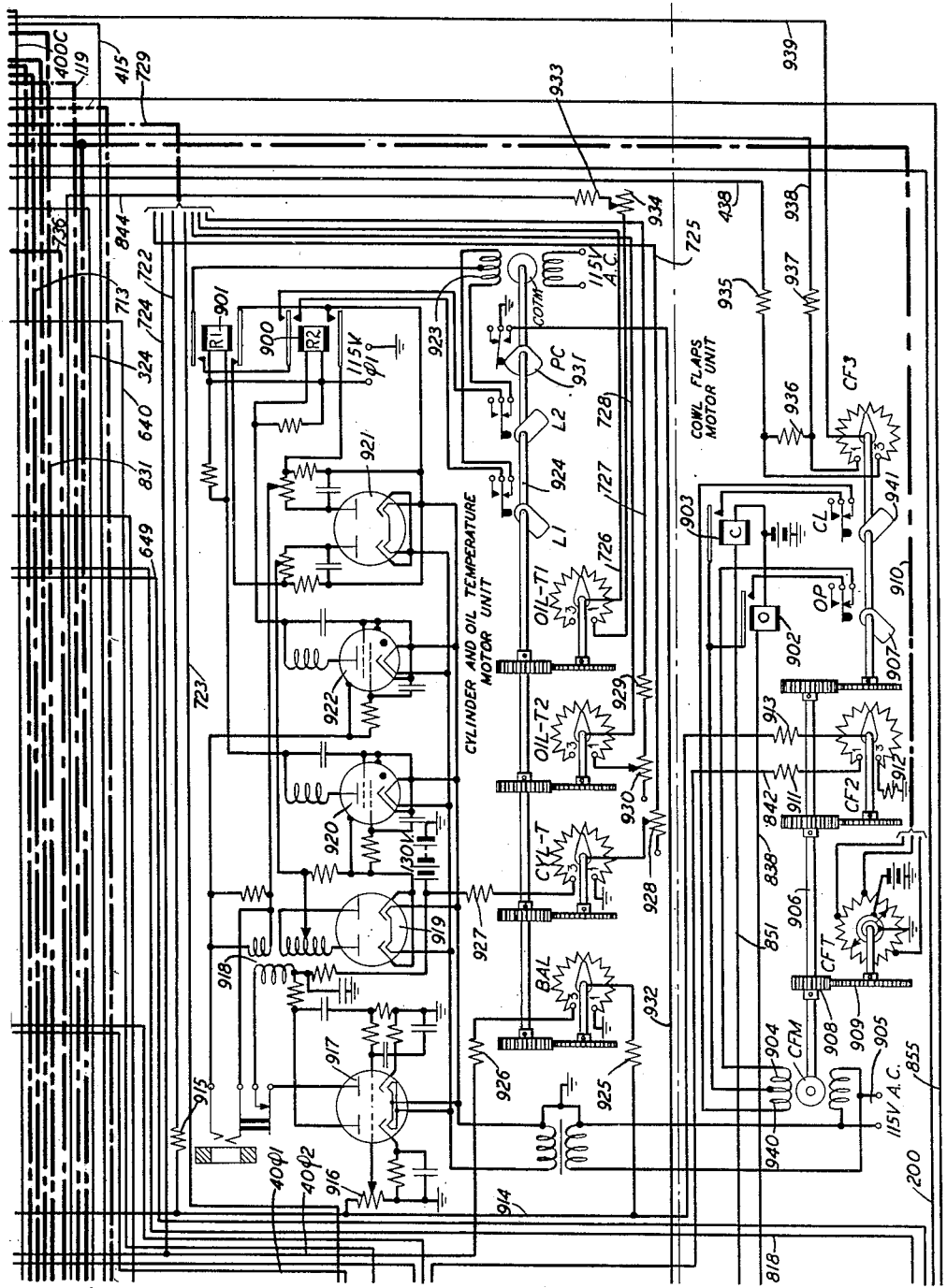

Patented May 9, 1950

2,506,949

UNITED STATES PATENT OFFICE 2,506,949

GROUND TRAINER FOR TRAINING AIRCRAFT CREW MEMBERS

Frederick M. Burelbach, Cranford, N. J., and Joseph J. Lukacs, New Rochelle, N. Y., assignors to Bell Telephone Laboratories, Incorporated, New York, N. Y., a corporation of New York Application June 25, 1946, Serial No. 679,069

19 Claims. (Cl. 35—12)

This invention relates to an aircraft trainer in which the operation of controls, similar to those of a standard aircraft, by the members of the crew causes the operation of instruments in the trainer and at an instructor's desk to simulate the instrument operations of an actual aircraft in flight whereby an aircraft crew may be given ground training to enable the crew members to coordinate their efforts to insure efficient aircraft operation under actual flying conditions in a regular aircraft. The invention relates more particularly to the circuits and apparatus of the trainer for simulating the control of the engines of a multiengined airplane and to the circuits under the control of a propeller feathering switch at the pilot's pedestal for simulating the effects due to the operation of the propeller blades to their fully feathered position and the effects due to the subsequent operation of the propeller blades to their unfeathered position.

In the training of aircraft personnel, it has been the practice heretofore to give pilots basic training in aircraft of the trainer type and to give them and the flight engineers ground training with the actual equipment of aircraft. Following such basic training it has been the practice to form crews from such basically trained personnel and to give such crews coordinated training in the flight of actual aircraft which they will later be assigned to fly in combat duty.

The larger aircraft, particularly multiengined bombers, are costly to build, to fly and to maintain and the use of such airplanes for extended training purposes with crews who may have had little or no experience in their operation, introduces a great hazard both to the equipment and to the operating personnel during the training period and obviously withdraws such airplanes from their more valuable use in actual combat service.

Since the members of the crew have all had basic training in flying and in the operation of the equipment of airplanes, the actual flying hours in the type of airplane which they will ultimately be assigned to fly may be materially reduced through the use of a ground trainer designed to simulate all of the flight and operational functions of the type of airplane to which they will later be assigned. After coordinated training in such a ground trainer, the crew training may be completed within a comparatively few hours of flying in an actual airplane.

In the application of R. C. Davis, E. J. Fogary and R. O. Rippere Serial No. 542,986, filed June 30, 1944, a ground trainer has been disclosed in which an airplane crew may be trained to perform all of the flight and operational functions which would be required to actually fly and operate an airplane which the trainer is designed to simulate and in the application of J. J. Lukacs and W. B. Strickler Serial No. 542,846, filed June 30, 1944, and in the application of C. E. Germanten, Serial No. 622,070, filed October 12, 1945 ground trainers have been disclosed in which an airplane crew may be trained to perform all of the operational functions which would be required to control the engines and propellers of a particular type of airplane.

It is the object of the present invention to provide a trainer in which the airplane crew may be trained to perform all of the operational functions which would be required to control the engines and propellers of a different type of multiengined airplane.

In the trainer which has been designed to attain the foregoing objects, circuits and apparatus have been provided which simulate the performance of the engines and propellers to develop the same responses which would be obtained in the actual airplane which the trainer simulates for manifold pressure, R. P. M., brake horsepower, propeller pitch, propeller efficiency, thrust, fuel flow, oil pressure, fuel pressure, cylinder temperature and oil temperature. For training purposes the simulated warm up time for the engines has been shortened. In controlling the engine functions, the switches, circuit breakers and fuel selector valves in the trainer require the same manipulation and provide the same control of simulated operation as in the airplane.

For a clearer understanding of the invention reference may be had to the following detailed description when read in connection with the accompanying drawings in which:

Fig. 1 shows in the upper left portion thereof a schematic representation of the motor unit which provides the altitude simulation; in the upper right portion the schematic representation of the motor unit which provides the brake horsepower simulation of one of the simulated engines and parts of the brake horsepower motor units of the other simulated engines; in the lower left portion the motor unit which simulates the control of a tachometer for one engine and in the lower right portion power supplies for the trainer;

Fig. 2 shows in the upper right portion thereof the motor unit which simulates the complete thrust of all of the engines of the simulated airplane, in the upper left portion thereof the motor unit which simulates the rate of fuel flow to one of the simulated engines and in the lower portion thereof the motor unit which simulates the manifold pressure response of one of the simulated engines;

Fig. 3 shows the upper portion thereof the motor unit and control circuit therefor which simulates the propeller pitch response of one of the simulated engines; in the lower left portion the propeller slip ratio motor unit for assisting in the determination of the propeller efficiency of the simulated engine driven propeller and in the lower right portion thereof the motor unit which simulates the functioning of the propeller governor appertaining to one of the engine driven propellers;

Figure 1:
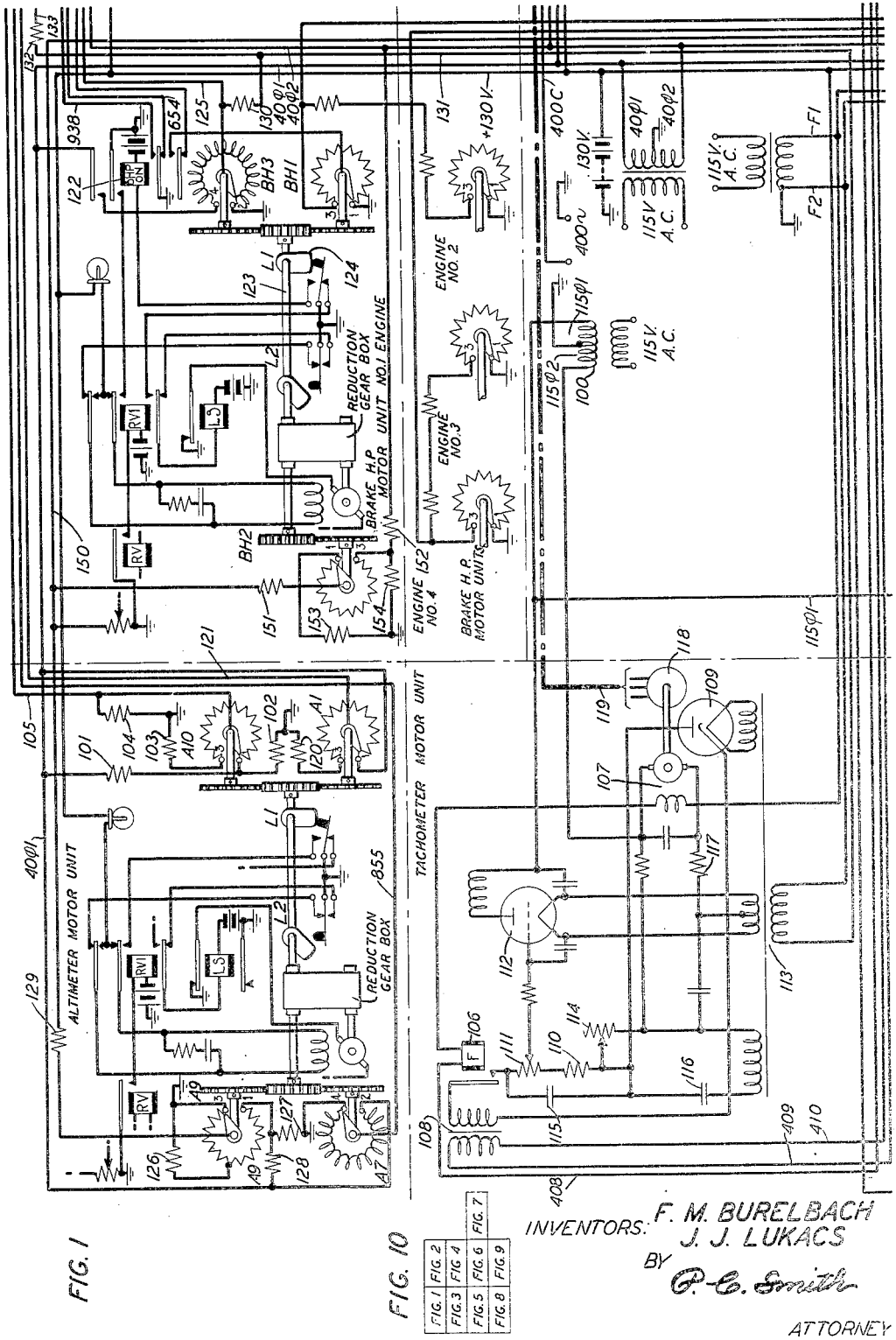

Fig. 8 shows to the left of the dot-dash line instruments and controls at the pilot's station on the flight deck; in the upper right portion the motor unit which simulates the production of oil pressure incident to the operation of one of the airplane engines and in the lower right portion the motor unit which simulates the production of fuel pressure in the fuel line of the carburetor of one of the airplane engines incident to the operation of a booster pump or the operation of the fuel pump driven by the engine;

Fig. 9 shows in the upper portion thereof the motor unit which simulates the production of cylinder and oil temperatures incident to the operation of an airplane engine and in the lower portion thereof the motor unit which simulates the operation of the cowl flaps of an airplane engine; and Fig. 10 is a chart showing how the other figures of the drawing should be arranged to completely disclose the invention.

The motor unit disclosed in Figs. 1 to 4, inclusive, are each of the type disclosed fully in Patent No. 2,428,767 granted to Albert, Davis, Gumley and Holden, on October 14, 1947. To simplify the drawing the control circuit of only one of the units, that is the propeller pitch motor unit of Fig. 3, has been disclosed in detail, each of the other units being skeletonized to merely show the motor, reduction gear box, limit switches and such of the potentiometers and variable transformers or "variacs" driven by the motor as enter into the simulation of the operation of an engine. The motor unit disclosed in Fig. 3 comprises a first dual vacuum tube VT1 which serves as a two stage resistance coupled amplifier to amplify the control signal applied to the control grid of the left unit from the slider of the gain control rheostat R1 which is connected to the input signal conductor 300, and to apply the amplified signal potential to the primary winding of the step-up input transformer T2. The amplified signal is impressed from the lower secondary winding of the transformer through the dual diode tube VT2, serving as a full wave rectifier, upon the control grid of the thyratron tube MI and the signal is also impressed from the upper secondary winding of the transformer upon the control grid of the thyratron tube R. Grid biases are applied to the control grids of the thyratron tubes MI and R from the right secondary winding of the power supply transformer T3 through the dual diode tube VT3 and are adjusted by the grid bias adjusting rheostats R2 and R3.

Tube MI upon firing causes the transmission of positive impulses through the rotor circuit of the motor M from the 115 volt phase $\varphi$1 bus bar 115$\varphi$1. Tube R upon firing causes the operation of the anode relay RV which in turn causes the operation of the stator reversing relay RV1. The stator winding of the motor is energized in a circuit over the contacts of relay RV1 from the +130 volt bus bar. Cathode heater current is supplied to the filaments of the tubes VT1, VT2, VT3 and R from the left secondary winding of the power supply transformer T3 and heating current is supplied to the filament of tube MI from the middle secondary winding of transformer T3. Anode potential is supplied to the anodes of tube VT1 from the +130 volt bus bar, anode potential is supplied from the 60 cycle 115 volt source of phase $\varphi$1 potential from source 100, over bus bar 115$\varphi$1 through choke coil 301 to the anode of tube MI and through the ballast resistance lamp 302, through the winding of relay RV and choke coil 303 to the anode of tube R.

Grid biasing potentials are applied from the right secondary winding of transformer T3 through the diode rectifier tube VT3 and rheostats R2 and R3 to the control grids of tube MI and R.

The motor M through the reduction gear box 304 drives the shaft 305 in one or the other direction, dependent upon the operated or unoperated condition of relay RV1, at a slow speed, and through pairs of gears such as 306, 307 and 308, 309 drives the sliders of potentiometers PP7 and PP8. The shaft 305 also has secured thereto cams 310 and 311 which control the contact sets of the L1 and L2 limit switches to cause the rotation of the motor M to cease when the sliders of the potentiometers approach their Nos. 1 and 3 winding terminals respectively. Certain of the motor units also are provided with other cam operated contact sets such as the contact set NUL operable by the cam 312 secured to the slider shaft of the potentiometer PP7.

The cylinder and oil temperature motor unit of Fig. 9 is similar to that just described except that the motor COTM thereof is of the shaded pole alternating current type, the stator winding of which is energized from the 115 volt supply circuit of the trainer and the shaded pole windings of which may be selectively short circuited to cause the motor to turn in one or the other direction dependent upon the operated or unoperated condition of the R2 relay 900 and the operated condition of the R1 relay 901. The motor CFM of the cowl flaps motor unit of Fig. 9 is also of the alternating current shaded pole type, the shaded pole windings of which are directly under the contcol of the O and C relays 902 and 903 controlled in turn from the Cowl flaps control switch 800 on the pilot's pedestal.

The motors OPM and FPM of the engine oil pressure and fuel pressure motor units of Fig. 8 are of the reversible universal type, the stator windings of which are energized by potential of 60 volts supplied from the full secondary winding of the power transformer T8 and the rotor windings of which may be energized by potentials of the same or reverse phase as supplied to the stator winding under the control of relays whereby the motors may be caused to rotate in one or the other direction at different speeds.

The fuel flow, manifold pressure, fuel pressure, oil pressure and cowl flaps indicators on the pilot's and instructor's instrument panels are driven by synchroreceivers connected over telemetric systems with synchrotransmitters associated with the corresponding motor units, such telemetric systems being supplied with 400 cycle power from the 400C bus bar. The tachometers on the pilot's and instructor's instrument panels are driven in the same manner as they would be driven in an actual airplane from tachometer generators associated with the tachometer motor unit. The cylinder temperature and oil temperature indicators are controlled by direct current potentiometers associated with the cylinder and oil temperature motor unit. It is to be understood that duplicates of these indicators and the motor units for controlling them would be provided for each engine to be simulated.

The engine throttles have the same appearance in the trainer that they would have in an actual airplane but each throttle is modified to control the sliders of four potentiometers. The carburetor mixture controls have also been modified by the addition of cams to each such control for operating contact sets.

Preparing the trainer for operation

Figure 5:
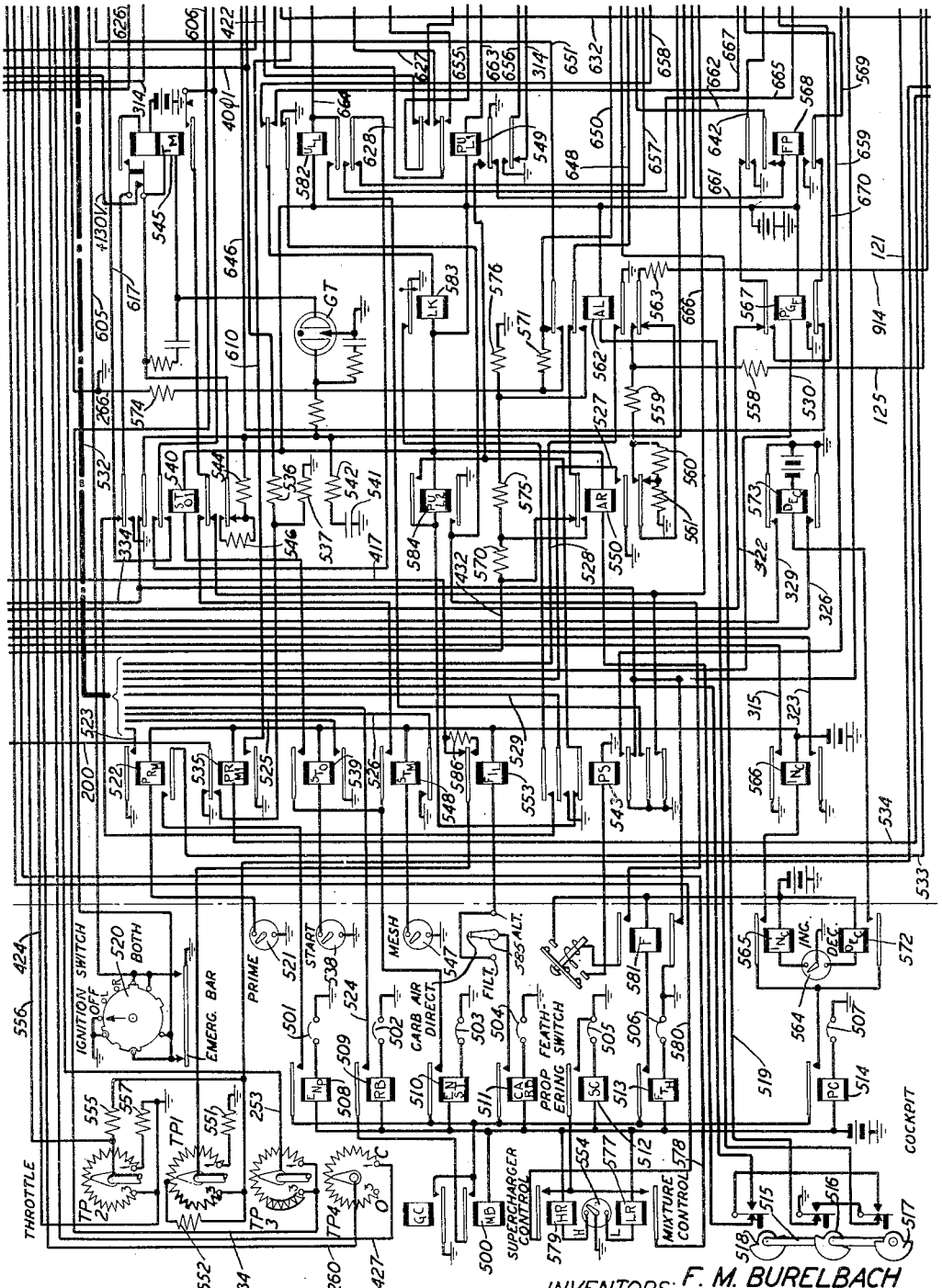
Fig. 5 shows to the left of the dot-dash line engine control circuit breakers and switches on the flight deck controllable by the pilot and to the right of the dot-dash line and in Fig. 6, circuits which simulate the starting and functioning of one of the engines in response to such controls.
Figure 6:
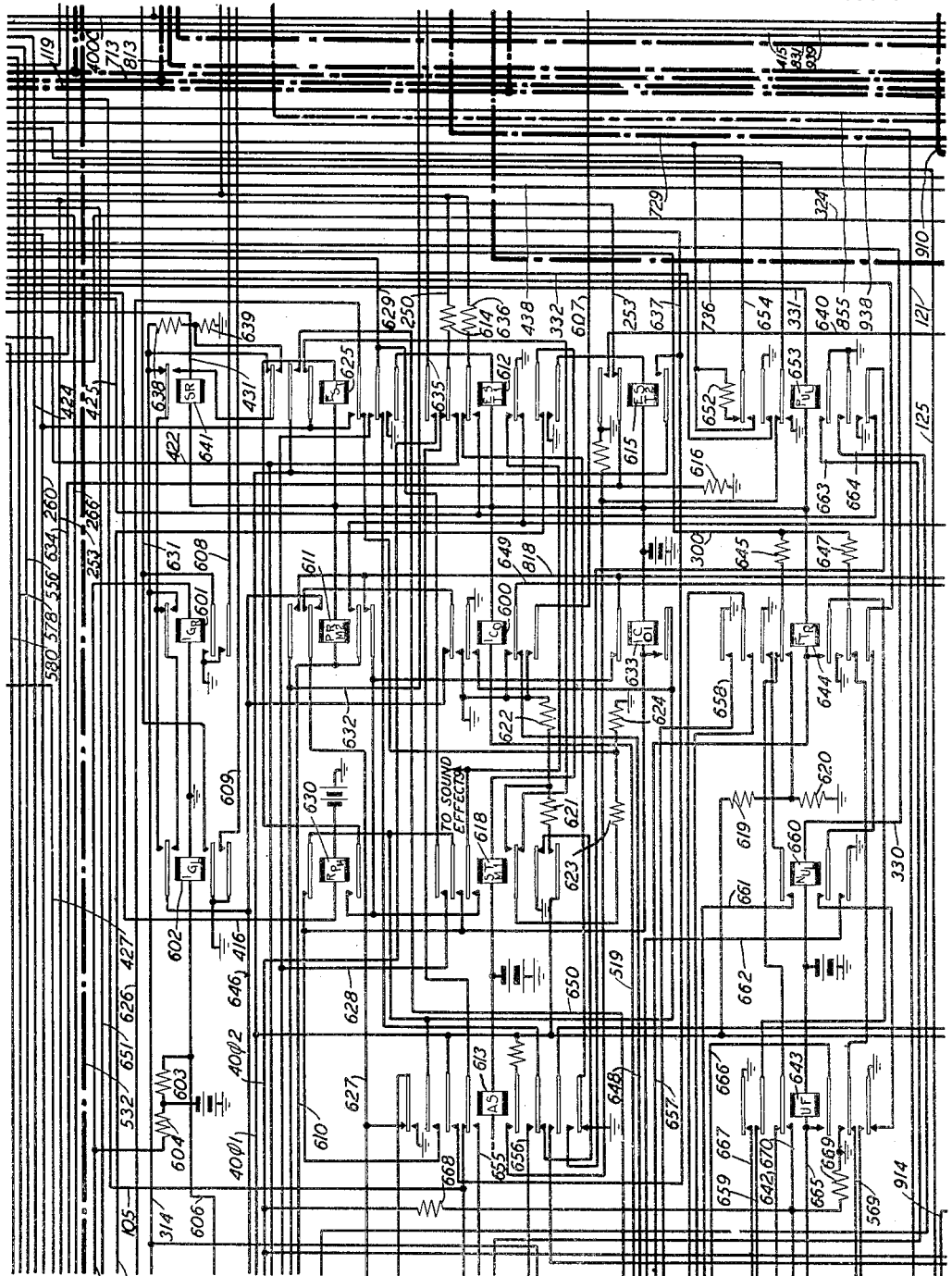
Figure 7:
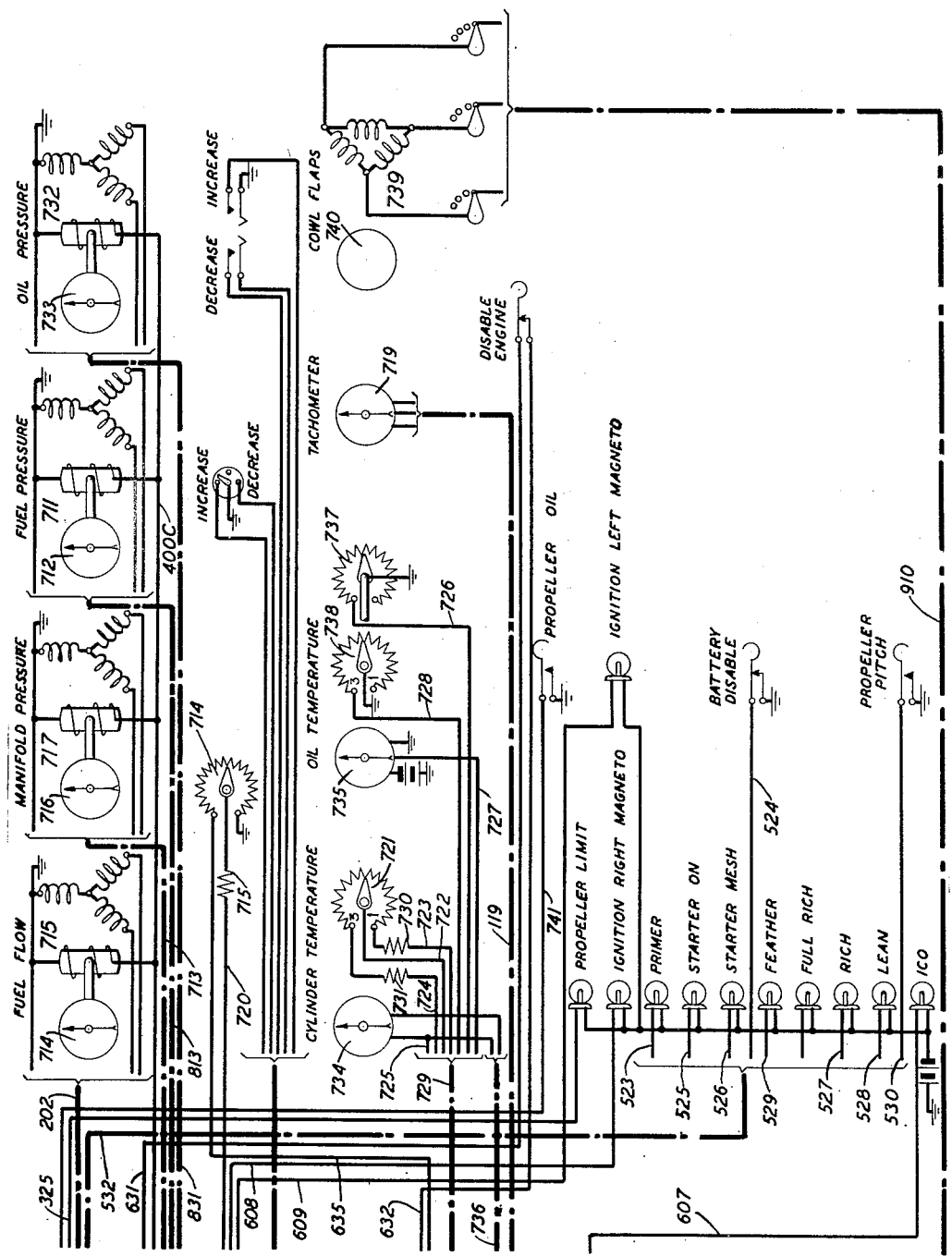
Fig. 7 shows instruments, signal lamps and controls at an intructor's desk.

To prepare the trainer for operation the battery switch (not shown) must be in its On position thereby causing the operation of the MB relay 500 of Fig. 5. The fuel selector valves (not shown) must be set to select a tank of fuel for each engine as represented by the operation of the FS relay 801 of Fig. 8 for the No. 1 engine and a fuel booster pump must be started to cause the simulation of the application of fuel pressure at the carburetor of each engine as represented by the operation of the BP relay 802 of Fig. 8 for the No. 1 engine. Also the circuit breaker switches required for the operation of the trainer should be closed. Some of these circuit breakers are represented at 501 to 507, inclusive, of Fig. 5, thereby causing the operation of the associated circuit breaker relays 508 and 514, inclusive. All controls at the instructor's desk, Fig. 7, should also be in their normal condition.

Before the engines are started and with a ground condition of flight simulated by the trainer, the manifold pressure indicators 816 and 716 on the pilot's and instructor's instrument panels should show the atmospheric pressure at the ground level, assumed to be sea level. To accomplish this a phase signal potential is applied to the signal input conductor 250 of the manifold pressure motor unit of Fig. 2. Since the manifold pressure at this time is solely a function of altitude, the potential applied to conductor 250 is derived at the slider of potentiometer A10 of the altimeter motor unit of Fig. 1 which will at this time be positioned at the No. 1 terminal of the potentiometer winding. The potentiometer winding is energized in a circuit from a tap between the resistors 101 and 102 of the potential divider extending from the 40φ1 bus bar through such resistors to ground, through the potentiometer winding and resistor 103 to ground. Potential derived at the slider of this potentiometer is then applied in parallel through resistor 104 to ground and over conductor 105, over the inner upper back contact of the AS relay 613 which will be unoperated since there is no simulated airspeed, over the upper back contact of the EST1 relay 612 since the No. 1 engine is assumed to have not started, and through resistor 614 to the signal input conductor 250 of the manifold pressure motor unit.

In response to this signal the motor unit will operate until the potential of phase φ2 derived at the slider of the balancing potentiometer MP4 and applied to conductor 250 through resistor 251 balances the signal potential of phase φ1. To derive this balancing potential, the winding of potentiometer MP4 is energized in a circuit from the 40φ2 bus bar, through resistor 252, through the winding of the potentiometer over conductor 253, over the upper back contact of the EST2 relay 615 and through resistor 616 to ground. Shaft 254 of the motor unit will thereby be rotated to a position representative of the manifold pressure of 30 inches of mercury. To indicate this manifold pressure, the manifold pressure indicators 716 and 816 are operated by the associated synchroreceivers 717 and 817 which are coupled over conductors of the cable 713 with the synchrotransmitter 255 driven through gears 256 and 257 from the shaft 254 of the manifold pressure motor unit.

Engine starting

To prepare an engine for starting, the battery switch should be closed as above stated to thereby cause the operation of the MB relay 500, the mixture control switch 515 should be in its idle cut-off position, as disclosed, whereby a circuit is established from ground over the normal contacts associated with cam 516, thence over conductor 519 and through the winding of the ICO relay 600 to battery and the ignition switch 520 should be in its Both position in which the IGR and IGL relays 601 and 602 will be permitted to operate. Relay 601 is connected in a circuit from ground through its winding and through resistor 604 to battery and relay 602 is connected in a circuit from ground through its winding and resistor 603 to battery, but the windings of these relays are normally shunted to ground over conductors 605 and 606 and over normally closed contacts of the ignition switch 520. When, however, the switch is moved to its Both position, ground is removed from both conductors 605 and 606 and relays 601 and 602 operate. The operation of the ICO relay 600, the IGR relay 601, the IGL relay 602 close circuits over conductors 607, 608 and 609 through the ICO, Ignition right magneto and Ignition left magneto lamps at the instructor's desk to battery whereby such lamps light to inform the instructor that the pilot has set the mixture and ignition controls preparatory to starting the engine. Relay 600 upon operating establishes the operating circuit for the ICO1 relay 633 which may be traced from ground over the upper inner front contact of relay 600, over the upper back contact of the RPM relay 630 and thence through the winding of relay 633 to battery. Relay 633 upon operating locks over its lower contacts directly to ground over the upper inner front contact of relay 600.

Before the priming of the engine may be simulated, fuel pressure must be established by the operation of a selector valve and a booster pump resulting in the operation of the FS and BP relays 801 and 802 of the fuel pressure motor unit as previously stated and as fully disclosed and described in the application of C. D. Koechling Serial No. 665,025, filed April 26, 1946.

This application has matured into Patent No. 2,491,668, dated December 20, 1949. With these relays operated a circuit is established for the ST relay 803 of the fuel pressure motor unit from ground over the lower contacts of the FS relay 801, over the lower contacts of the BP relay 802 and through the winding of relay 803 to battery. Relay 803 thereupon operates and establishes a circuit extending from ground over its upper front contact, over the back contact of the UL relay 804 and through the winding of the IFP relay 805 to battery. Relay 805 thereupon operates and establishes a circuit through the rotor of motor FPM which may be traced from the ground terminal of the secondary winding of transformer T8, through such secondary winding to the 25-volt tap thereof, thence through the rotor winding of the motor and over the front contacts of relay 805 to ground and, since the stator winding of the motor is bridged across the secondary winding of transformer T8, the motor will now operate to turn the shaft 806 at a slow speed in a clockwise direction representative of an increase in the fuel pressure in the fuel line to the carburetor of the engine, assumed to be the No. 1 of the four engines. When the shaft has been rotated to a position representative of a pressure of 17 pounds per square inch the cam 807 will operate the springs of the contact set UL to their alternate position thereby establishing a circuit from ground over the inner upper front contact of relay 803, over such cam operated contacts and through the winding of the UL relay 804 to battery, whereupon such relay will operate and lock to ground over the inner upper front contact of relay 803 and at its upper back contact will open the previously traced circuit of relay 805. Relay 805 thereupon releases to open the rotor circuit of motor FPM and such motor thereupon comes to rest. The rotation of shaft 806 has also been instrumental through gears 808 and 809 in rotating the rotor of the synchrotransmitter 810 thereby causing the synchroreceiver 811 to operate and to set the fuel pressure indicator 812 on the pilot's instrument panel and the synchroreceiver 711 to operate and set the fuel pressure indicator 712 at the instructor's desk over conductors of cable 813 to indicate a fuel pressure of 17 pounds per square inch. As soon as shaft 806 moves from normal or the position representative of zero pounds fuel pressure, cam 821 permits the closure of the contact set associated therewith, thereby establishing an obvious circuit for the LL relay 822.

The fuel pressure motor units (not shown) associated with the Nos. 2, 3 and 4 engines, function in a similar manner, thereby causing the fuel pressure indicators for such engines at the pilot's and instructor's instrument panels to indicate similar fuel pressures of 17 pounds per square inch in the fuel lines extending to the carburetors of the Nos. 2, 3 and 4 engines.

Upon observing that there is fuel pressure for priming each of the engines, the pilot will proceed to start each of the engines in the usual order of precedence. To start the No. 1 engine, the pilot operates the prime switch 521 thereby establishing the circuit of the PRM relay 522 in simulation of the operation of the solenoid operated valve on the carburetor which admits raw fuel from the carburetor to the intake manifolds of the top cylinders of the engine. With relay 822 operated, representative of the presence of fuel at the carburetor, the operation of relay 522 establishes a circuit from ground over its upper contacts and conductor 523 of cable 532 and through the Primer lamp at the instructor's desk to battery whereupon such lamp lights to inform the instructor that the prime switch for the No. 1 engine has been closed. With the prime circuit breaker 501 closed as previously described, a circuit is now established from ground over the Battery disable key at the instructor's desk, over conductor 524 of cable 532, over contacts of the RB relay 509 which operated upon the closure of the battery circuit breaker 502, over contacts of the MB relay 500, over contact of the ENP relay 508, which operated upon the closure of the prime circuit breaker 501, over the lower contacts of the PRM relay 522, over conductor 533, over the lower contacts of the operated LL relay 822, over conductor 534 and through the winding of the PRM1 relay 535 to battery.

Relay 535 upon operating establishes a circuit from ground over its lower contacts and conductor 610 and through the winding of the PRM2 relay 611 to battery whereupon the latter relay operates. Over its upper contacts relay 535 also applies potential of phase $\varphi 1$ from the potential divider connected between the 40 $\varphi 1$ bus bar through resistors 536 and 537, over its upper contacts to the signal input conductor 200 of the fuel flow motor unit of Fig. 2. Under the control of such signal potential, such motor unit functions to rotate its shaft 201 into a position representative of a fuel flow at the rate of 125 pounds of fuel per hour as will be represented by the fuel flow indicators 814 and 714 on the pilot's and instructor's instrument panels, which indicators are driven by the synchroreceivers 815 and 715, respectively, operated over the conductors of cable 202 through the operation of the synchrotransmitter 203 driven by the gears 204 and 205 from shaft 201 of the fuel flow motor unit. The shaft 201 of the fuel flow motor unit also turns the slider of potentiometer FF7 until a potential derived therefrom of phase $\varphi 2$ and applied through resistor 206 to the signal input conductor 200, balances the signal potential of phase $\varphi 1$ applied to conductor 200. For deriving the balancing potential of phase $\varphi 2$, the winding of potentiometer FF7 is energized from the $40 \varphi 2$ bus bar in a circuit through resistor 207 and the winding of the potentiometer to ground.

The release of the prime switch 521 now permits the PRM and PRM1 relays 522 and 535 to release but the PRM2 relay 611 remains operated because of its locking circuit extending over its inner lower contact and the inner lower back contact of the EST1 relay 612 to ground.

When the start switch 538 is now closed, an obvious circuit is established for the STO relay 539 which, upon operating, at its lower contacts establishes a circuit over conductor 525 of cable 532 and through the Starter on lamp at the instructor's desk to battery to inform the instructor that the pilot has closed the start switch. With the start circuit breaker closed as previously described, the operation of relay 539 also establishes the circuit for the STO1 relay 540 which may be traced as previously described from ground over the contacts of the Battery disable key at the instructor's desk, over contacts of the MB relay 500, thence over contacts of the ENST relay 510 and the upper contacts of relay 539 through the winding of the STO1 relay 540 to battery. Relay 540 upon operating removes at its middle upper back contact the short circuit of capacitor 541 which extends from ground therethrough, through resistor 542, over the middle upper back contact of relay 540 and to ground over the inner lower back contact of the PS relay 543 whereupon condenser 541 starts to charge in a circuit from ground therethrough, through resistors 542, 544 and 546, over the lower front contact of relay 540 and the normal contacts of the TM relay 545 to the +130-volt bus bar. In approximately ten seconds the voltage across the capacitor will reach the breakdown potential of the gas tube GT and the tube will fire to complete a circuit from the +130-volt bus bar through the lower winding of relay 545 and through the tube, whereupon relay 545 will operate and lock over its upper winding and upper contacts to ground at the upper front contact of relay 540. After waiting about ten seconds, following the operation of the start switch 538, to simulate the time required for the electrically driven inertia starter used in an actual airplane to attain its full speed, which time, is measured by the operation of the tube GT, the pilot operates the mesh switch 547 which in an actual airplane will control the meshing of the starter with the engine. Upon the operation of switch 547, an obvious circuit is established for the STM relay 548 which upon operating establishes a circuit from ground over its lower contacts and conductor 526 of cable 532 to light the Starter mesh lamp at the instructor's desk to inform the instructor that the starter meshing has been simulated. If relay 545 has at this time operated, representative of the elapse of the interval which should be measured to permit the starter to gain speed before being meshed with the engine, a circuit is now established from ground as previously traced at the contacts of the MB relay 500, over contacts of the ENST circuit breaker relay 510, over the upper contacts of relay 548, over the inner lower contacts of relay 540, over the lower contacts of relay 545, over the inner upper front contact of relay 540, over conductor 617, over the lower back contact of the EST1 relay 612 and through the winding of the STM1 relay 618 to battery.

Figure 4:
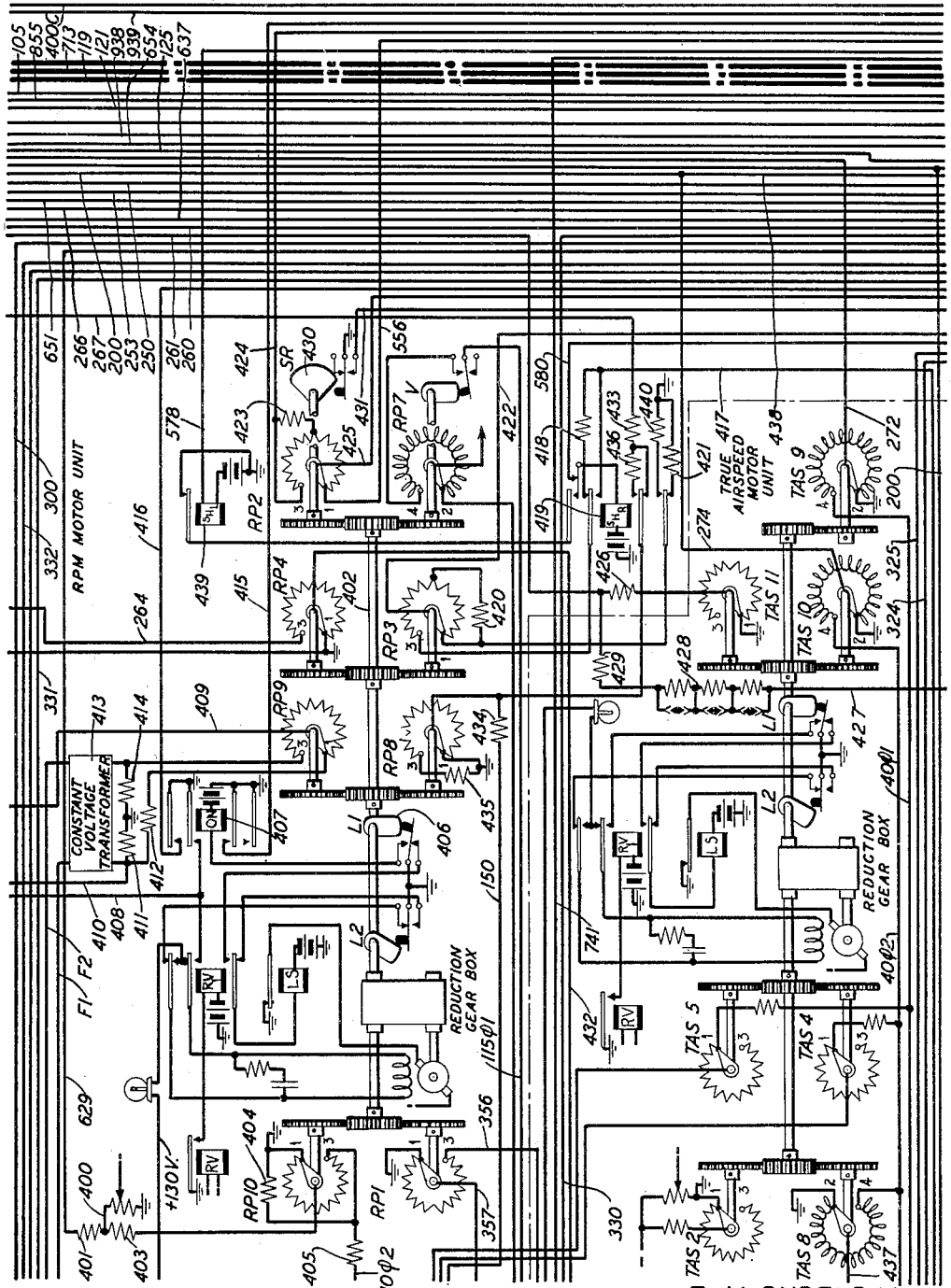
Fig. 4 shows in the upper portion thereof the motor unit which simulates the speed of operation of one of the simulated engines and in the lower portion thereof the motor unit which simulates the true airspeed of a simulated flight.

With relay 618 operated, potential of phase φ1 is applied to the signal input conductor 400 of the RPM motor unit of Fig. 4. This potential is derived from the potential divider comprising resistors 621 and 622 connected serially between the 40φ1 bus bar and ground over the lower contacts of relay 618. From the junction point between resistors 621 and 622 potential is derived and applied over the inner lower contacts of relay 618 and through resistors 623 and 624 to ground. From the junction point between the latter resistors potential is derived and applied over the inner lower back contact of the EST relay 625, over conductor 626 and through the winding of the potentiometer PP1 of the propeller pitch motor unit and through resistor 313 to ground. From the slider of this potentiometer, which will be assumed to be at the No. 1 terminal of its winding or in the increased RPM position, potential is applied over conductor 314, over the upper front contact of relays 601 and 602, over the inner upper front contact of the PRM2 relay 611, over conductor 627, over the inner upper back contact of the PUL1 relay 540, over conductor 628, over the upper contacts of relay 618 and thence over conductor 629 and through resistor 401 to the input signal conductor 400 of the RPM motor unit. This potential will be small and will cause the motor of such motor unit to rotate the shaft 402 into a position representative of the speed at which the engine would operate under the control of the inertia starter. The shaft 402 will rotate until potential of phase φ2 derived at the slider of the balancing potentiometer RP10 and applied through resistor 403 to signal input conductor 400, balances the phase φ1 signal potential. To derive the balancing potential, the winding of potentiometer RP10 is connected from ground in parallel with resistor 404 and through the resistor 405 to the 40φ2 bus bar.

When the shaft 402 moves from its normal position the cam 406 permits the contacts of the L1 limit switch to move to their alternate position thereby closing an obvious circuit for the ON relay 407. With relay 407 operated a circuit is established from ground over its upper contacts, conductor 416, and through the winding of the RPM relay 630 to battery. Relay 630 upon operating establishes a circuit for the EST relay 625 which will operate to simulate the operation of the engine under its own power, if fuel pressure is present as will be simulated by the operation of the LL relay 822 of the fuel pressure motor unit and if the ignition circuit has been closed as will be simulated by the operation of either the IGR or the IGL relays 601 and 602. This circuit may be traced from ground over the inner lower contacts of the latter relays, over conductor 631, over contacts of the Engine disable key at the instructor's desk, over conductor 632, over the next-to-inner lower contacts of the LL relay 822, over conductor 818, thence over the lower contacts of the PRM2 relay 611, through the lower contacts of the RPM relay 630 and through the winding of the EST relay 625 to battery. The circuit from ground extending over the lower contacts of relay 611 is also extended over the inner upper contacts of relay 618 to the sound effects circuit (not shown) whereupon such latter circuit becomes effective to simulate the engine noise.

The EST relay 625 upon operating establishes an obvious circuit over its lower contacts for the EST1 relay 612 which operates and in turn establishes a circuit over its lower contacts for the EST2 relay 615. Relay 612, upon operating, opens at its inner lower back contacts, the locking circuit for the PRM2 relay which thereupon releases and opens at its lower back contact the circuit of the STM1 relay 618 which thereupon releases. Following the release of relay 618, the start circuit to the sound effects circuit is maintained over the inner lower front contact of relay 612.

When the ON relay 407 of the RPM motor unit operated, a circuit was also established thereby from ground over its inner upper contacts, over conductor 408, through the winding of the F relay 106 of the tachometer motor unit and through the stator winding of the motor 107 of such unit to the +130-volt direct current bus bar thereby energizing the stator winding of the motor and causing relay 106 to operate and establish a circuit through the secondary winding of transformer 108, through the diode rectifier tube 109, through resistor 110, through rheostat 111 and over the contacts of relay 106. A positive direct current signal potential which varies in accordance with the signal potential applied to the primary winding of transformer 108 is now derived at the slider of rheostat 111 and applied to the control grid of tube 112, superposed on an alternating current biasing potential derived at such slider by the application of alternating current from the left secondary winding of the transformer 113, through rheostat 114, resistor 110, rheostat 111 and through condensers 115 and 116.

The signal potential applied to the primary winding of transformer 108 is derived from the slider of the RP9 potentiometer of the RPM motor unit and varies with the engine speed. It is applied from such slider over conductor 409 through the primary winding of the input transformer 108 of the tachometer motor unit, thence over conductor 410 and through resistor 411 to ground. To enable the derivation of potential at such slider, the winding of potentiometer RP9 is connected through resistor 412 across the secondary winding of the constant voltage transformer shunted by resistors 411 and 414. The primary winding of both the constant voltage and power supply transformers 413 and 113 are connected to the filament supply bus bars F1 and F2.

The anode of tube 112 is supplied with 115-volt phase φ1 potential from the source 100 and thus when the tube 112 fires in response to the input signal, the rotor circuit of motor 107 is established from the 115φ1 bus bar through the tube 112 to the mid-tap of the middle secondary winding of transformer 113, thence through resistor 117, through the rotor circuit of the motor to the 115φ2 bus bar. The motor is thereby caused to rotate at a speed dependent upon the input signal as determined by the position of the slider of the RP9 potentiometer, or the simulated engine speed. The motor operates the tachometer generator 118 which is electrically coupled over conductors of cable 119 with the tachometers 719 and 819 on the instructor's and pilot's instrument panels and these tachometers then indicate the assumed engine speed.

As a further result of the operation of the ON relay 407 of the RPM motor unit, a circuit is established from ground over its lower contacts, over conductor 415 and through the winding of the RPM relay 820 of the engine oil pressure motor unit and thence to battery. Relay 820 thereupon operates establishing a circuit from ground over its upper contacts, over the back contact of the L2 relay 823, over the upper back contact of the NP relay 824 and through the winding of the IOP relay 825 to battery. Relay 825 thereupon operates and establishes the rotor circuit of motor OPM from ground over the front contacts of relay 825 through the rotor circuit to the 25-volt tap of the secondary winding of transformer T8 and thence through the two lower sections of the secondary winding to ground. Since the stator winding of the motor is bridged across the secondary winding of the transformer, the motor now turns the shaft 826 in a direction representative of an increase in oil pressure until cam 827 operates the contacts of the limit switch L2 to their alternate position thereby establishing a circuit from ground over the inner lower contacts of relay 820, over the contacts of switch L2 and through the winding of the L2 relay 823 to battery. Relay 823 then operates to open the previously traced circuit of relay 825 to stop the motor. Relay 823 locks over its upper front contact under the control of relay 820.

The shaft 826 through the gears 828 and 829 operates a synchrotransmitter 830 which is coupled over conductors of cable 831 with the synchroreceivers 832 and 732 to operate the oil pressure indicators 833 and 733 on the pilot's and instructor's instrument panels to show readings of 100 pounds per square inch.

Having simulated the starting of the No. 1 engine as will be indicated by the reading of the tachometer 819 and the simulated engine noise, the pilot restores the start and mesh switches 538 and 547 thereby releasing the STO and STM relays 539 and 548, relay 548 upon releasing in turn releasing the STM1 relay 618. The release of the PRM2 relay 611, which resulted from the operation of the EST1 relay 612 as previously described, would result in the release of the EST, EST1 and EST2 relays 625, 612 and 615 and the simulated stopping of the engine, if the pilot did not operate the fuel mixture control 515 from the idle cut-off to the automatic rich position before the RPM relay 630 releases, since if the ICO relay 600 does not release, no circuit for the EST relay 625 is established. When, therefore, the pilot operates switch 515 to cause cams 516 and 517 to operate their associated contact sets to their alternate positions, the previously traced circuit for the ICO relay 600 is opened and relay 600 releases and a circuit is established from ground over the alternate contacts of the contact sets operated by cams 516 and 517 and over the normal contacts of the contact set associated with cam 518 and through the winding of the automatic rich (AR) relay 550 to battery.

Relay 600 upon releasing, relases relay 633 and opens the circuit of the ICO lamp at the instructor's desk. Relay 550 upon operating closes a circuit from ground over its inner lower contacts and conductor 527 of cable 532 for the Rich lamp at the instructor's desk which lights to inform the instructor that the pilot has operated the mixture control 515 to its automatic rich position. With relay 633 now released the circuit of the EST relay 625 extends from ground over the inner lower contacts of relays 601 and 602, over conductor 631, over the contacts of the Disable engine key at the instructor's desk, over conductor 632, over contacts of the LL relay 822, over conductor 818, over the back contacts of the ICO1 relay 633 and the lower contacts of the RPM relay 630 and through the winding of relay 625 to battery. Relay 625 thus remains operated and in turn maintains the EST1 and EST2 relays 612 and 615 both operated.

*Manifold pressure indication*

As soon as the EST, EST1 and EST2 relays 625, 612 and 615 operate as previously described, the circuit previously traced over which phase φ1 potential was applied to the input signal conductor 250 of the manifold pressure motor unit becomes opened at the upper back contact of relay 612 and the circuit over which phase φ2 potential was applied to the winding of the balancing potentiometer MP4 of the manifold pressure motor unit becomes opened at the upper back contact of relay 615. However, new circuits are now effective for supplying control potentials to conductor 250 under the control of the throttle rheostats and in accordance with the assumed altitude of the flight, the setting of the supercharger control and the engine speed.

A potential of phase φ1 is applied to signal input conductor 250 under the control of altimeter potentiometer A1, RPM potentiometer RP3 and throttle potentiometer TP2. To attain this, the winding of the altimeter potentiometer A1 is energized in a circuit from the bus bar 40φ1 through the potentiometer winding and resistor 120 to ground and the phase φ1 potential derived from the slider of the potentiometer is applied over conductor 121 through the winding of the throttle potentiometer TP1 and resistor 551 to ground. It will be noted that the portion of this potentiometer between the center tap and the No. 3 terminal is shunted by the resistor 552 so that as the slider moves from the No. 1 terminal toward the No. 3 terminal the potential of phase $\varphi 1$ derived at such slider will vary at one rate until the center tap position is reached and will then vary at a slower rate as the slider approaches the No. 3 terminal. The potential derived at the slider of potentiometer TP1 is then applied over the back contact of the FIL relay 553, over conductor 417, through resistor 418, over the inner upper back contact of the SHR relay 419, through the winding of potentiometer RP3 of the RPM motor unit, the first 50 per cent of the winding of which is shunted by resistor 420, thence over the lower back contact of relay 419 and through resistor 421 to ground. With a portion of the winding of potentiometer RP3 shunted as just described, the potential derived at the slider of such potentiometer will increase at one rate as the simulated engine speed increases from zero to about 1600 revolutions per minute and will then increase at a faster rate as the engine speed increase further. This potential which increases as the throttle opens and increases as the RPM of the engine increases is then applied from the slider of potentiometer RP3 over conductor 422, over the middle upper front contact of the EST1 relay 612, through resistor 614 and thence to the signal input conductor 250 of the manifold pressure motor unit.

At the same time potential of phase $\varphi 1$ derived at the slider of potentiometer A1 of the altimeter motor unit and applied to conductor 121 is applied through resistor 555 to the slider of throttle potential TP2 and also over conductor 556 through the winding of potentiometer RP2 of the RPM motor unit, the upper half of which winding is shunted by resistor 423, thence over conductor 424 to ground. The winding of throttle potentiometer TP2 is shunted by resistor 557 and the No. 3 terminal is connected to ground so that as the slider is moved toward the No. 3 terminal as the throttle is opened the shunt of the winding of the potentiometer RP2 afforded by the throttle potentiometer TP2 becomes increasingly more effective with the result that the energization of the winding of potentiometer RP2 decreases as the throttle opens. Phase $\varphi 1$ potential derived at the slider of potentiometer RP2 will decrease at one rate as the simulated RPM of the engine increases to about 1600 revolutions per minute and will thereafter decrease at a slower rate as the RPM further increases. This derived potential is applied over conductor 425, over the inner upper front contact of the EST1 relay 612, through resistor 636 and thence to the signal input conductor 250 of the manifold pressure motor unit and decreases as the throttle opens and decreases as the RPM increases.

Thus two potentials of phase $\varphi 1$ are applied to signal input conductor 250 under the control of the throttle potentiometers TP1 and TP2 and under the control of the RPM potentiometers RP2 and RP3. The summation of these potentials with the throttle about ten per cent open for idling the engine at about 625 revolutions per minute, will be less than the potential of phase $\varphi 2$ which also becomes applied to the signal input conductor 250 through resistor 251 from the slider of the manifold pressure potentiometer MP4 as previously described. However, with the EST2 relay 615 now energized, the shunt of the throttle potentiometer TP3 which formerly existed over the upper back contact of relay 615 is no longer effective and as a consequence the potential applied to the winding of potentiometer MP4 and consequently the potential applied from the slider of such potentiometer to conductor 250 is dependent upon the throttle opening. The circuit over which the winding of potentiometer MP4 is now energized may be traced from ground through resistor 616, over conductor 634, through the winding and over the slider of potentiometer TP3, over conductor 253 through the winding of potentiometer MP4, and through resistor 252 to the $40\varphi 2$ bus bar. The first 82 per cent of the winding of potentiometer TP3 is short circuited and thus until the throttle is 82 per cent closed this potentiometer has no effect on the energization of the MP4 potentiometer. After the throttle has opened to the 82 per cent position this phase $\varphi 2$ potential will thus first decrease and thereafter decrease and then increase as the manifold pressure increases.

Since the summation of the phase $\varphi 1$ potential applied to signal input conductor 250 at the ten per cent throttle opening is less than the phase $\varphi 2$ potential now applied to such conductor the motor of the manifold pressure motor unit will be operated in a direction representative of a reduction of manifold pressure to return the slider of potentiometer MP4 toward the No. 1 terminal of its winding until the potential of phase $\varphi 2$ applied from its slider again balances the summation of the phase $\varphi 1$ signal potential. The sliders of the MP1, MP2 and MP3 potentiometers will be similarly adjusted and the synchrotransmitter 255 will control the synchro-receivers 717 and 817 to reset the manifold pressure indicators 716 and 816 at the instructor's and pilot's instrument panels until they read about 20 inches of mercury.

The pilot now advances the throttle until the tachometer 819 shows an assumed engine speed of 1000 revolutions per minute. The opening of the throttle causes the movement of the slider of potentiometer TP4 to cause an increase in the phase $\varphi 1$ potential applied thereover to signal input conductor 250 of the manifold pressure motor unit. To derive this potential which will vary with the throttle opening, with the manifold pressure and with the propeller pitch, potential of phase $\varphi 1$ is supplied from the $40\varphi 1$ bus bar over the lower contacts of the EST2 relay 615, over conductor 637, through resistor 258, thence by one parallel path through the winding of potentiometer MP1 of the manifold pressure motor unit to conductor 261 and thence through resistor 426 and through the true airspeed potentiometer TAS11 to ground. Also in parallel from resistor 258, through resistor 259, over conductor 260, through the throttle potentiometer TP4, over conductor 427 and through resistors 428, 429 and 426 to ground at the potentiometer TAS11. Until the slider of potentiometer MP1 reaches the No. 3 terminal of its winding, a portion of its winding is shunted over its slider and through resistor 259. The potential thus present at the slider of the throttle potentiometer TP4 will be determined by the manifold pressure, by the throttle opening and by the true airspeed of the simulated flight. This potential is then applied from conductor 260 over the inner lower contacts of the EST relay 625, over conductor 626, through the winding of the propeller pitch potentiometer PP7 and resistor 313 to ground whereby such potential is further modified in accordance with the simulated propeller pitch and applied over conductor 314 and through resistors 638 and 639 to ground, and in parallel with such resistors over the upper front contacts of relays 601 and 602, over the upper back contact of the ICO relay 600, the upper back contact of the PRM2 relay 611, conductor 627, over the inner upper back contacts of the PULI relay 549, conductor 628, over the middle lower front contact of the EST relay 625, conductor 629 and through resistor 401 to the signal input conductor 400 of the RPM motor unit.

In response to this signal the RPM motor unit operates until this phase $\varphi 1$ signal potential becomes balanced by the phase $\varphi 2$ potential applied to conductor 400 from the slider of the balancing potentiometer RP10 and thereby rotates the shaft 402 into a position representative of an engine speed of 1000 revolutions per minute.

With the opening of the throttle and the increase of the engine speed to 1000 revolutions per minute the potential of phase $\varphi 1$ applied from the slider of the potentiometer RP3 to the signal input conductor 250 of the manifold pressure motor unit will increase and the potential of phase $\varphi 1$ applied from the slider of potentiometer RP2 to conductor 250 will decrease and the summation of such potentials will be less than the phase $\varphi 1$ summation potential applied to conductor 250 before the engine speed was increased to 1000 revolutions per minute and as a consequence the manifold pressure motor unit will cause its shaft 254 to rotate in a direction representative of a slight decrease in pressure below 20 inches of mercury as will be shown by the manifold pressure indicators 716 and 816.

*Simulation of cylinder and oil temperatures*

The temperature of the engine oil and engine cylinders is dependent upon the brake horsepower delivered by the motor, upon the fuel mixture and upon the open or closed condition of the engine cowl flaps. It will be assumed that the cylinder temperature indicators 734 and 834 at the instructor's desk and on the pilot's instrument panel, and the oil temperature indicators 735 and 835 at the instructor's desk and on the pilot's instrument panel under normal conditions and before the engine is started all indicate a temperature of 15 degrees centigrade. It will also be assumed that the pilot has operated the cowl flaps switch 800 to its open position and has closed the cowl flaps circuit breaker switch 836 thereby causing the operation of the circuit breaker (CF) relay 837. A circuit is thereupon established from ground over the contacts of relay 837, over the contacts of switch 800 in its open position, over conductor 838 and through the O relay 902 of the cowl flaps motor unit to battery. Relay 902 thereupon operates and short-circuits the right shaded pole winding 904 of the motor CFM and with the stator winding of such motor energized from the 115-volt supply 905, the motor turns the shaft 906 at a slow speed in such a direction as to move the sliders of the potentiometers CF2 and CF3 toward the No. 3 terminals of their windings until if the control switch 800 is maintained closed for a sufficient time, the cam 907 will open the contacts of limit switch OP to release relay 902 and to stop the motor.

The rotation of shaft 906 through the gears 908 and 909 operates the telemetric transmitter CFT which over conductors of cable 910 controls the telemetric receivers 739 and 839 to operate the cowl flaps position indicators 740 and 840 at the instructor's desk and on the pilot's instrument panel to indicate that the cowl flaps have been opened.

The winding of the cowl flaps potentiometer CF2 is energized in a circuit from the $40\varphi 1$ bus bar over the inner lower contacts of the EST relay 841 of the engine oil pressure motor unit, over conductor 842, through resistor 911, through the winding of potentiometer CF2 and through resistor 912 to ground so that upon the movement of the slider of such potentiometer, potential of phase $\varphi 1$ is applied therefrom through resistor 913 to the signal input conductor 914 of the cylinder and oil temperature motor unit. The EST relay 841 is at this time operated over a circuit established from ground over the upper contacts of the EST2 relay 615 and over conductor 640.

It is to be noted that this signal potential is not applied to the signal input conductor 914 until the engine starts and that the potential over conductor 914 is increased by the movement of the slider of the variac BH3 of the brake horsepower motor unit. To supply this augmented potential the winding of the variac is connected from ground to the $40\varphi 1$ bus bar by the operation of the BHP–ON relay 122 which operates as soon as the simulated engine starts to develop power as represented by the rotation of shaft 123 and the closure of the circuit of relay 122 by the operation of the contacts of limit switch L1 to its alternate position through the movement of cam 124 as will later be described. The potential derived at the slider of variac BH3 is applied over conductor 125, through resistors 558, 559, 560 and 561 to ground and a potential derived from such potential divider is applied from the junction point between resistors 559 and 560, over the lower front contacts of the AR relay 550, over the lower back contact of the AL relay 562 and through resistor 563 to the signal input conductor 914. This potential is not only increased to represent the increase in cylinder and oil temperature as the power output of the engine is increased, but is also increased when the AR relay 550 operates representative of the change of the fuel mixture from idle cut-off to automatic rich.

The instructor may also by the movement of the slider of rheostat 721 apply no potential or a predominant potential of either phase $\varphi 1$ or phase $\varphi 2$ over conductor 722 of cable 729 and through resistor 915 to the signal input conductor 914 of the cylinder and oil temperature motor unit to cause no change in the indicated cylinder and oil temperature indications or to cause an increase or decrease in the indicated temperature. For this purpose the No. 1 terminal of rheostat 721 is connected through resistor 730, over conductor 723 of cable 729 and over the upper contacts of the EST relay 841 of the engine oil pressure motor unit to the $40\varphi 1$ bus bar and the No. 3 terminal of rheostat 721 is connected through resistor 731 and over conductor 724 of cable 729 to the $40\varphi 2$ bus bar.

With the cowl flaps open, tending to slow down the heating up of the engine, the slider of rheostat 721 is set to cause a normal temperature indication of 15 degrees centigrade and when the slider of variac BH3 moves to a position representative of the power output of the engine at the assumed engine speed of 1000 revolutions per minute, the summation of the phase $\varphi 1$ and $\varphi 2$ potentials applied to control conductor 914 will be a phase $\varphi 1$ potential which will be applied across the amplifier gain control rheostat 916. The phase φ1 potential derived at the slider of rheostat 916 is applied to the control grid of the left unit of the dual amplifier tube 917, is amplified by the cascaded units of the tube and is applied to the input transformer 918. Through the response of the tubes 919, 920 and 921 of the motor control circuit in a manner fully described in connection with propeller pitch motor unit of Fig. 3, the R1 relay 901 is caused to operate and with tube 922 not firing in response to a phase φ1 signal and consequently the R2 relay 900 not operated, the left shaded pole winding 923 of the motor COTM is short-circuited by a circuit extending over the upper contacts of relay 901, over the upper back contact of relay 900 and through the normal contacts of the L2 limit switch and the motor COTM is thereby caused to rotate the shaft 924 at a slow speed in a direction representative of an increase in temperature. The sliders of potentiometers BAL, CYL-T, OIL-T1 and OIL-T2 are now rotated toward the No. 3 terminals of their windings. As the slider of balancing potentiometer BAL advances, potential of phase φ2 in increasing value is applied through resistor 925 to the signal input conductor 914 until when such potential balances the signal potential of phase φ1 applied to such conductor, no potential appears on the control grid of the left unit of amplifier tube 917 and relay 901 thereupon releases and the motor COTM comes to rest. For deriving the potential of phase φ2 at the slider of potentiometer BAL, the potentiometer winding is energized over a circuit extending from the 40φ2 bus bar through resistor 926 and through the potentiometer winding to ground.

In response to the adjustment of the slider of potentiometer CYL-T, a circuit is established from battery through resistor 927, through the potentiometer winding, through the calibrating rheostat 928, over conductor 725 of cable 729, through the cylinder temperature indicator 734 at the instructor's desk and in parallel therewith over the conductors of cable 736, through the winding of indicator 834 at the pilot's station and through resistor 943 to ground. Also in response to the adjustment of the slider of potentiometer OIL-T1, a circuit is established from battery through the oil temperature indicator 835 on the pilot's instrument panel, over conductor 844, through resistor 933 and calibrating rheostat 934, through potentiometer OIL-T1, over conductor 726 of cable 729 and through rheostat 737 at the instructor's desk to ground. Also in response to the adjustment of potentiometer OIL-T2 a circuit is established from battery through the oil temperature indicator 735 at the instructor's desk, over conductor 727 of cable 729, through resistor 929 and calibrating rheostat 930, through the potentiometer OIL-T2 and over conductor 728 of cable 729 to ground through the rheostat 738 at the instructor's desk. Under the conditions assumed the cylinder temperature indicators 734 and 834 will slowly increase their readings from 15 degrees centigrade to about 100 degrees centigrade after an interval of about three minutes and the oil temperature indicators 735 and 835 will slowly increase their readings from 15 degrees centigrade to about 40 degrees centigrade after an elapse of about three minutes.

*Decrease of oil pressure as the oil temperature increases*

As the shaft 924 rotates to a position representing an increase of oil temperature above 37 degrees centigrade cam 931 releases the PC switch whereby a circuit is established from ground over such switch, over conductor 932 and through the winding of the T relay 845 of the engine oil pressure motor unit to battery. Relay 845 thereupon operates and, with L2 relay 823 operated as previously described, establishes a circuit from ground over its lower contacts over the lower back contact of the NP relay 824, over the lower contacts of relay 823 and through the winding of the DOP1 relay 846 to battery. Relay 846 now operates and closes a circuit extending over its contacts, over the back contacts of the IOP1, DOP and IOP relays 847, 848 and 825, through the rotor winding of motor OPM and thence through the middle secondary winding of transformer T8 whereby the motor OPM is caused to rotate the shaft 826 at a slow speed and in a direction representative of a decrease in oil pressure until the cam 849 closes the NP contacts. When the NP contacts are closed a circuit is established from ground over the inner lower contacts of relay 820, over the upper front contacts of relay 823, over the upper contacts of relay 845, over the contacts of contact set NP and to battery through the winding of the NP relay 824. Relay 824 thereupon operates locking over its front contacts to ground over the inner lower contacts of relay 820, and opening at its lower back contact the circuit of relay 846 which releases and stops the motor OPM. The synchro-transmitter 836 has now been readjusted through the rotation of shaft 826 to control the synchro-receivers 732 and 832 to cause the oil pressure indicators 733 and 833 on the instructor's and pilot's instrument panels to show the reduction of oil pressure to about 85 pounds per square inch which would result in an actual engine due to the heating of the oil.

*Magneto check—spark retarded*

Before simulating a take-off the two magnetos of each engine should be checked to determine if they are both operating. The pilot first applies the brakes of the trainer (not shown) and holds the stick (not shown) full back, and then advances the throttles of the engines until the tachometers, such as tachometer 819, read 2300 revolutions per minute. In response to the advance of the throttle for the No. 1 engine the slider of the throttle potentiometer TP4 is advanced toward the No. 3 terminal of its winding thereby increasing the potential of phase φ1 applied as previously described to control conductor 400 of the RPM motor unit and such unit then functions as previously described to rotate the shaft 402 until the slider of the balancing potentiometer RP10 has applied a balancing potential of phase φ2 to conductor 400 which balances the throttle potential of phase φ1. At this time the shaft 402 will have been set in a position representative of an engine speed of 2300 revolutions per minute and under the control of the potentiometer RP9 the tachometer motor unit will be operated to cause the indicators 719 and 819 to read 2300 revolutions per minute.

As a result of the advance of the sliders of throttle potentiometers TP1 and TP2 and the new settings of the sliders of the RPM potentiometers RP2 and RP3 for an engine speed of 2300 revolutions per minute the summation of the phase φ1 potentials applied to control conductor 250 of the manifold pressure motor unit first decreases at one rate until an engine speed of about 1100 revolutions per minute is reached and then increases at an increased rate as determined by the shunted center tapped potentiometers RP2 and RP3 and the throttle potentiometers TP1 and TP2. As a result of the decrease of potential applied to control conductor 250 until the engine speed exceeds 1100 revolutions per minute, the manifold pressure motor unit functions in the manner previously described to cause shaft 254 to be rotated in a direction representative of a decrease of manifold pressure thereby causing the manifold pressure indicators 716 and 816 to decrease their readings to show a manifold pressure of about 20 inches of mercury. Thereafter as the throttle is opened and the engine speed increases to 2300 revolutions per minute, and the summation potential increases, the manifold pressure unit functions to cause the readings of the indicators to increase to show a manifold pressure of about 27 inches of mercury. Thus lowering and then increasing the manifold pressure as the throttle is opened, closely simulates the actual performance of an airplane engine.

As the RPM increases to a value above 2200 revolutions per minute cam 430 closes the contacts of the SR switch thereby establishing a circuit from ground thereover, over conductor 431 and through the winding of the SR relay 641 to battery, whereupon relay 641 operates. The pilot will now turn the ignition switch 520 to the L position in which ground will be connected to conductor 605 and the IGR relay 601 will be shunted down, simulating the disconnection of the right magneto, so that the engine will be fired by the left magneto only. With the SR relay 641 now operated, the circuit from which a derived potential of phase φ1 was applied to signal input conductor 400 of the RPM motor unit is modified. The potential of phase φ1 derived at the slider of potentiometer PP7 of the propeller pitch motor unit is now applied over conductor 314, through resistor 638, over the upper front contact of the EST relay 625, over the front contact of the SR relay 641, over the back contact of relay 601, the upper front contact of relay 602 and thence as traced to input conductor 400 of the RPM motor unit. The potential of phase φ1 thus applied to conductor 400 is thus slightly reduced in value and the potential of phase φ2 applied to conductor 400 from the slider of balancing potentiometer RP10 will be greater than the reduced potential of phase φ1 and the motor of the RPM motor unit will therefore be operated in such a direction as to return the slider of balancing potentiometer RP10 toward the No. 1 terminal of its winding until the phase φ2 potential becomes equal to the phase φ1 signal potential. As a result of the operation of the motor driven shaft 402, the tachometer motor unit will be controlled by the potentiometer RP9 to cause a resetting of the tachometers 735 and 835 to show a reduction in engine speed of 50 to 75 revolutions per minute. This simulates the reduction of engine speed resulting from the operation of the engine on the left magneto only. While the IGR relay 601 is shunted down the Ignition right magneto lamp at the instructor's desk becomes extinguished to inform the instructor that the pilot has disabled the ignition circuit of the right magneto.

When the ignition switch 520 is returned to its Both position, relay 601 reoperates to reestablish the circuit previously traced over which potential of phase φ1 was applied to the signal input conductor 400 of the RPM motor unit whereupon such motor unit is controlled to again restore the readings of the tachometers to 2300 revolutions per minute. Relay 601 also causes the relighting of the Ignition right magneto lamp at the instructor's desk. The pilot then turns the ignition switch 520 into the R position in which ground will be connected to conductor 606 and the IGL relay 602 will be shunted down, simulating the disconnection of the left magneto, so that the engine will be fired by the right magneto only. With the SR relay 641 now operated, the circuit from which a derived potential of phase φ1 was applied to signal input conductor 400 of the RPM motor unit is modified. Potential of phase φ1 derived at the slider of potentiometer PP7 of the propeller pitch motor unit is now applied over conductor 314, through resistor 638, over the upper front contact of the EST relay 625, over the front contact of the SR relay 641, over the back contact of the IGL relay 602 and thence as traced to signal input conductor 400 of the RPM motor unit. This motor unit now functions to rotate the shaft 402 into a position representative of a reduction of engine speed which is indicated by the resetting of the tachometers 735 and 835 to show a reduction of engine speed of 50 to 75 revolutions per minute. This simulates the reduction in engine speed resulting from the operation on the right magneto only. While the IGL relay 601 is shunted down the Ignition left magneto lamp at the instructor's desk is extinguished to inform the instructor that the pilot has disabled the ignition circuit of the left magneto. When the ignition switch 520 is restored to its Both position, relay 601 again reoperates causing the Ignition left magneto lamp to relight and to cause the indicated RPM to again increase to 2300 revolutions per minute.

*Magneto check—spark advance*

When the pilot makes a magneto check with the start advance condition simulated, the throttle is adjusted until an engine speed of 2200 revolutions per minute is indicated. Under this condition the cam 430 on the shaft 402 of the RPM motor unit does not cause the closure of the previously traced circuit of the SR relay 641. Consequently, when the ignition switch is moved to its L position and the IGR relay 601 is released, the potential of phase φ1 derived at the slider of the potentiometer PP7 of the propeller pitch motor unit will be applied through the potential divider comprising resistors 638 and 639 to ground and potential derived from such potential divider will be applied from the upper terminal of resistor 638, over the upper back contact of relay 641, over the upper back contact of relay 601, over the upper front contact of relay 602, and thence as traced to the signal input conductor 400 of the RPM motor unit. There will therefore be no reduction in the signal potential resulting from the release of the IGR relay 601 and therefore no reduction in the indicated engine speed from 2200 revolutions per minute. Similarly, when the ignition switch is moved to the R position and the IGL relay 602 is released, the potential of phase φ1 derived at the upper terminal of the potential divider comprising resistors 638 and 639 will be applied over the upper back contact of relay 641, over the upper back contact of relay 602 and thence as traced to signal input conductor 400 of the RPM motor unit. There will, therefore, be no reduction in the signal potential resulting from the release of the IGL relay 602 and therefore no reduction in the indicated engine speed from 2200 revolutions per minute. The Ignition right magneto and Ignition left magneto lamps at the instructor's desk will be extinguished as previously described upon the release of relays 601 and 602, respectively.

*Engine simulation under take-off conditions*

To simulate take-off the pilot releases the brakes, allows the control to return to its normal position, operates the super charger control 554 to its lower gear ratio position, checks to make sure that the propeller pitch control switch 564 is in its INC position and slowly advances the throttles toward their open position. When the control 554 is moved to its L position an obvious circuit is closed for the LR relay 577 which closes a circuit from ground over the contacts of the SC circuit breaker relay 512, over the contacts of relay 577, over conductor 578 and through the winding of the SHL relay 439 of the RPM motor unit to battery. Relay 439 operates and opens the locking circuit for the SHR relay 436. Relay 577 also lights a lamp (not shown) at the instructor's desk indicative of the L position setting of control 554. It has been assumed that the propeller pitch of each propeller has been adjusted to its full increased RPM position but it was not explained how this was accomplished. It will be assumed that the propeller pitch has not previously been so adjusted and that to adjust it the pilot operates the switch 564 for each propeller to its INC position thereby establishing an obvious circuit for relay 565 which in turn establishes the circuit of the INC relay 566, it being assumed that the circuit breaker relay 514 has been previously operated by the closure of the circuit breaker switch 507.

Relay 566 upon operating establishes a circuit from ground over its upper contacts, over conductor 315 and the back contact of the H relay 316 of the propeller governor motor unit and through the right shaded pole winding of the motor GM of such unit to ground. With the stator winding of the motor GM energized from te F1 and F2 bus bars, the motor GM turns the shaft 317 at a slow speed, in a direction representative of an increase in propeller speed thereby moving the slider of the potentiometer PG11 toward the No. 3 terminal of its winding. The winding of this propeller governor potentiometer being energized over a circuit from the 40φ2 bus bar, through resistor 318, through the winding of the potentiometer and resistor 319 to ground, the winding and resistor 319 being shunted by resistor 320, an increasing value of potential of phase φ2 is derived from the slider of such potentiometer until when the slider approaches the No. 3 terminal the winding, cam 321 operates the contact set H to its alternate position thereby causing the operation of the H relay 316 and the consequent stopping of the motor GM.

With the INC relay 566 still held operated by the continued operation of the switch 564 to its INC position and the H relay of the propeller governor motor unit operated, a circuit is now closed from ground over the lower contacts of relay 566, over conductor 323, over the lower front contact of relay 316, over conductor 324 and through the Propeller limit lamp on the pilot's pedestal to battery. A parallel circuit is also established from ground on conductor 323 over the inner lower front contact of relay 316, over conductor 325, and through the Propeller limit lamp at the instructor's desk to battery. When the Propeller limit lamps light, the pilot and instructor know that the propeller governor has caused the propeller pitch to be decreased to its full limit. The pilot will then return the switch 564 to its neutral position.

The phase φ2 potential derived at the slider of potentiometer PG11 is applied over conductor 322, over the upper back contact of the PGF relay 567, over the upper back contact of the FP relay 568, over conductor 642, over the inner upper back contact of the UF relay 643, over the inner upper back contact of the FTR relay 644, through resistor 645 to signal input conductor 390 of the propeller pitch motor unit. This unit is now controlled to rotate its shaft 305 in a direction representative of a reduction in pitch or an increase in RPM. When the shaft 305 reaches a position representative of the reduction of propeller pitch to its lowest limit, cam 310 operates the L1 limit switch to the position disclosed to stop the motor M.

As a result of the advancement of the throttle the sliders of throttle potentiometers TP1 and TP2 move toward the No. 3 terminals of their windings with the result that the signal potential of phase φ1 applied to the signal input conductor 259 of the manifold pressure motor unit under the control of the throttle potentiometer TP1 increases and the phase φ1 potential applied to conductor 259 under the control of potentiometer TP2 decreases until when the throttle becomes fully opened the latter potential becomes zero. The signal applied under the control of potentiometer TP1, however, supplies the main control of the indicated manifold pressure, the signal controlled by potentiometer TP2 providing the partly open throttle effect of manifold pressure indications increasing with a decrease in RPM. As the phase φ1 potential applied to conductor 259 increases the motor of the manifold pressure motor unit rotates shaft 254 and the slider of balancing potentiometer MP4 until the potential of phase φ2 applied from the slider thereof to conductor 259 balances the signal potential of phase φ1 when the motor will stop. At this time the shaft will have rotated into a position representative of the manifold pressure of 54 inches of mercury which will be indicated by the manifold pressure indicators 716 and 816.

As the manifold pressure increases and the slider of manifold pressure potentiometer MP1 moves toward the No. 3 terminal of its winding, the phase φ1 potential applied over the circuit previously traced through resistor 258 and through potentiometer MP1 to conductor 260 and thence to the signal input conductor 400 of the RPM motor unit increases. This potential is further increased due to the increase in the resistance of the shunt of the potentiometer winding extending from conductor 260 through the throttle potentiometer TP4, resistor 420, resistor 429 and conductor 261. Consequently the RPM motor unit will rotate its shaft 402 in a direction representative of an increase in RPM until the slider of balancing potentiometer RP10 reaches a position in which potential of phase φ2 derived therefrom and applied to conductor 400 balances the signal potential of phase φ1 when the motor of the RPM motor unit will stop. Under the control of potentiometer RP9 the tachometer motor unit will now have been controlled to cause the tachometers 719 and 819 to show an engine speed of 2800 revolutions per minute.

As the RPM motor unit operates to represent an increase in RPM the sliders of potentiometers RP2 and RP3 will be moved to cause an increase in the phase φ1 signal potential applied to the signal input conductor 259 of the manifold pressure motor unit to cause the shaft 254 thereof to rotate in a direction representative of an increasing manifold pressure which will be indicated by the manifold pressure indicators 116 and 816. It will therefore be seen that the manifold pressure and RPM motor units interact through the operation of their potentiometers RP2, RP3 and MP1.

It has been assumed that the propeller governor motor unit has been operated to a position representative of minimum propeller pitch or maximum RPM, for example 2800 revolutions per minute, and that as a consequence the maximum value of phase φ2 potential has been applied from the slider of the potentiometer PP7 to the signal input conductor 300 of the propeller pitch motor unit. As the throttle is opened and the simulated manifold pressure increases in the manner just described, resulting in the movement of the slider of potentiometer MP1 toward the No. 3 terminal of its winding, a potential of phase φ1 of increasing value is applied to the signal input conductor 309 of the propeller pitch motor unit. This phase φ1 potential derived at the slider of potentiometer MP1 is applied over conductor 259, over the inner lower front contact of the EST relay 625 and thence over conductor 626 through the winding of potentiometer PP7 of the propeller pitch motor unit and through resistor 313 to ground as previously described and the potential of phase φ1, is applied over conductor 314, over the upper front contacts of relays 601 and 602, over conductor 646, over the lower back contact of the PGF relay 567, over the lower back contact of FP relay 568, over conductor 569, over the next to lower back contact of the UF relay 643, over the next to lower back contact of the FTR relay 644 and through resistor 647 to signal input conductor 300.

Should the throttle be opened to an extent that through the increase of the simulated manifold pressure this phase φ1 potential exceeds the phase φ2 potential applied under the control of the propeller governor motor unit, the propeller pitch motor unit will rotate the shaft 395 in a direction representative of an increase in propeller pitch or a decrease in RPM, thereby moving the slider of propeller pitch potentiometer PP7 toward the No. 3 terminal of its winding to reduce the phase φ1 potential applied to signal input conductor 300 until it balances the phase φ2 propeller governor signal potential. This reduction of the phase φ1 potential also reduces the phase φ1 potential applied to the signal input conductor 400 of the RPM motor unit thereby causing such unit to operate in a manner representative of a reduction in RPM. Thus the RPM motor unit is so controlled that it cannot operate to a position representative of a higher engine speed than that called for by the propeller governor motor unit, in the case assumed 2800 revolutions per minute. This simulates the functioning of the propeller governor of an actual airplane to maintain the engine speed at any specified value.

As the airspeed increases in response to the increase in engine speed the slider of the true airspeed potentiometer TAS11 moves towards the No. 3 terminal of its winding, thereby decreasing the energization of the winding of the manifold pressure potentiometer MP1 and the phase φ1 potential derived therefrom which reduces the signal potentials applied to the signal input conductor 400 of the RPM motor unit to cause such unit to operate in a manner representative of a reduction in RPM.

Fuel flow simulation

With an increase in manifold pressure and an increase in RPM as represented by the movement of the sliders of the MP2 and RP4 potentiometers toward the No. 3 terminals of their windings, an increased potential of phase φ1 is applied to the signal input conductor 200. To derive this potential, potential of phase φ1 is applied from the 40 φ1 bus bar through resistor 262, through the winding of potentiometer MP2 and through resistor 263 to ground, the potential derived at the slider of such potentiometer being applied over conductor 264, through the winding of potentiometer RP4 to ground and the potential derived at the slider of the latter potentiometer being applied over conductor 432, through resistor 570, over the upper front contact of the AR relay 550 now operated representative of an automatic rich fuel mixture, over the inner upper back contact of the AL relay 562, over conductor 648, over the inner lower back contact of the ICO relay 600, over conductor 649, over the inner lower front contact of the LL relay 822 of the fuel pressure motor circuit and to signal input conductor 200 of the fuel pressure motor unit. Under the control of this signal potential the motor unit will rotate its shaft 201 until the potential of phase φ2 applied to conductor 209 from the slider of the balancing potentiometer FF7 balances the phase φ1 signal potential. The fuel flow motor unit will then have caused the resetting of the fuel flow indicators 116 and 814 to indicate a fuel flow at the rate of 975 pounds of fuel per hour. As the simulated flight gains altitude, a phase φ1 potential derived at the junction between resistors 853 and 854 included in the potential divider extending from ground through such resistors and over conductor 855 to the slider at altitude variac A7, is applied over the inner upper front contact of relay 822 at the fuel pressure motor unit to signal input conductor 200 of the fuel flow motor unit which will decrease as the altitude increases.

Brake horse-power simulation

As a further result of the simulated operation of the engine as previously described, the brake horse-power motor unit is operated to rotate its shaft 123 into a position representative of the production of power. Brake horse-power is a function of manifold pressure, supercharger setting, fuel mixture, engine RPM and also increases with the altitude due to the decrease in back pressure at the exhaust manifold of the engine. To control the brake horse-power motor unit of Fig. 1 in simulation of the increase of horse-power due to fuel mixture, manifold pressure, RPM and supercharger setting, a potential of phase φ1 is applied from the 40 φ1 bus bar over the middle upper front contact of the EST relay 625, operated to represent the operation of the engine, over conductor 650, over the upper back contact of the AL relay 562, over conductor 651, through the winding of potentiometer MP3 of the manifold pressure motor unit, through resistor 265 and over conductor 266 to ground. The phase φ1 potential now derived at the slider of potentiometer MP3 is then applied over conductor 267, through resistor 433, over the inner lower back contact of the SHR relay 419, through resistor 434 and to the signal input conductor 150 of the brake horse-power motor unit of Fig. 1. This potential is modified by a variable ground leak which is derived from the slider of the RPM potentiometer RP8, the winding of which is connected in a circuit extending from ground therethrough and through resistor 435 to ground.

It will be noted that if the fuel mixture is changed from automatic rich to automatic lean and the AL relay 562 becomes operated, the resistors 571 and 574 become connected into a potential divider and potential therefrom is applied over the previously traced circuit over which phase $\varphi 1$ potential was applied to energize the winding of the manifold pressure potentiometer MP3, and as a consequence the potential applied to the signal input conductor 150 becomes slightly decreased representative of a reduction in brake horse-power due to a change in the fuel mixture to automatic lean. The signal potential will increase as the manifold pressure increases and the slider of potentiometer MP3 moves toward the No. 3 terminal of its winding, will increase as the RPM increases and the slider of potentiometer RP8 moves toward the No. 3 terminal of its winding and will decrease when the SHR relay 419 is operated to simulate the high speed operation of the supercharger blower by the introduction of resistor 436 in series with resistor 433 in the previously traced circuit. This latter reduction in the signal represents the reduction of power incident to the additional power consumed in running the supercharger blower.

A second phase $\varphi 1$ potential is also applied to signal input conductor 150 which is not effective until an airborne condition of flight is simulated and which increases at one rate as the altitude increases to a specified value and then increases at a slower rate thereafter. To derive this latter potential, the winding of altimeter potentiometer A9, the upper half of the winding of which is shunted by resistor 126 and the whole winding of which is shunted by resistor 127, is connected from the $40\varphi 1$ bus bar, through resistor 128, to ground and the potential derived at the slider of such potentiometer is applied through resistor 129 to signal input conductor 150.

In response to the summation of these phase $\varphi 1$ potentials, the brake horse-power motor unit rotates its shaft 123 until the potential of phase $\varphi 2$ derived at the slider of its balancing potentiometer BH2 and applied through resistor 151 to control conductor 150, balances the phase $\varphi 1$ potential applied to such conductor, when the shaft will come to rest. To derive the balancing potential the winding of potentiometer BH2 is connected in series with resistors 152 and 153 between the $40\varphi 2$ bus bar and ground, the winding of the potentiometer being shunted by the serially connected resistors 153 and 154.

The thrust developed by each engine propeller of an airplane is the result of combining the propeller slip ratio efficiency characteristic of such propeller and the brake horse-power of the engine which drives it, as modified by the drag effects of cowl flaps and the windmilling of the propeller with a dead engine and dividing the result by the true airspeed. In the trainer the thrust factors developed by all of the engines are added together in a thrust motor unit the shaft of which assumes a position representative of the combined thrust of all of the propellers.

The propeller slip ratio which is one of the factors required to determine the thrust output of a propeller is based on the efficiency curves for various blade angles of the propeller. In the trainer it is reduced to a position of the shaft 350 of the propeller slip ratio motor unit of Fig. 3 and represents the true airspeed as determined by the true airspeed variac TAS8 divided by the product of the RPM as determined by the RPM potentiometer RP1, of the propeller pitch as determined by the propeller pitch potentiometer PP8 and a constant as determined by the resistor 352. This is accomplished by developing a potential of phase $\varphi 2$ representing a potential which varies in accordance with the true airspeed, dividing this potential in accordance with the propeller pitch and applying it to the signal input conductor 350 of the propeller slip ratio motor unit and equating such potential to the balancing potential of phase $\varphi 1$ applied to conductor 350 which represents the propeller slip ratio multiplied by the RPM.

To develop the phase $\varphi 2$ potential the winding of the true airspeed variac TAS8 is connected between the $40\varphi 2$ bus bar and ground and the potential developed at the slider of such variac is applied over conductor 437, through the winding of the propeller pitch potentiometer PP8 and through resistor 352 to ground, the potential derived at the junction point between such potentiometer winding and resistor 352 being applied through resistor 353 to signal input conductor 350. At the same time phase $\varphi 1$ potential is applied from the $40\varphi 1$ bus bar, through resistor 354 and through the winding of balancing potentiometer PS3 of the propeller slip ratio motor unit, shunted by resistor 355, to ground, and potential derived at the slider of the latter potentiometer is applied over conductor 356 through the winding of potentiometer RP1 of the RPM motor unit to ground. The phase $\varphi 1$ potential thus derived at the slider of potentiometer RP1 is then applied over conductor 357 and through resistor 358 to conductor 350.

In response to the summation of these potentials the propeller slip ratio motor unit will rotate its shaft 351 in such a direction as to cause the phase $\varphi 1$ potential applied from the slider of its balancing potentiometer PS3 to balance the phase $\varphi 2$ potential.

Figure 2:
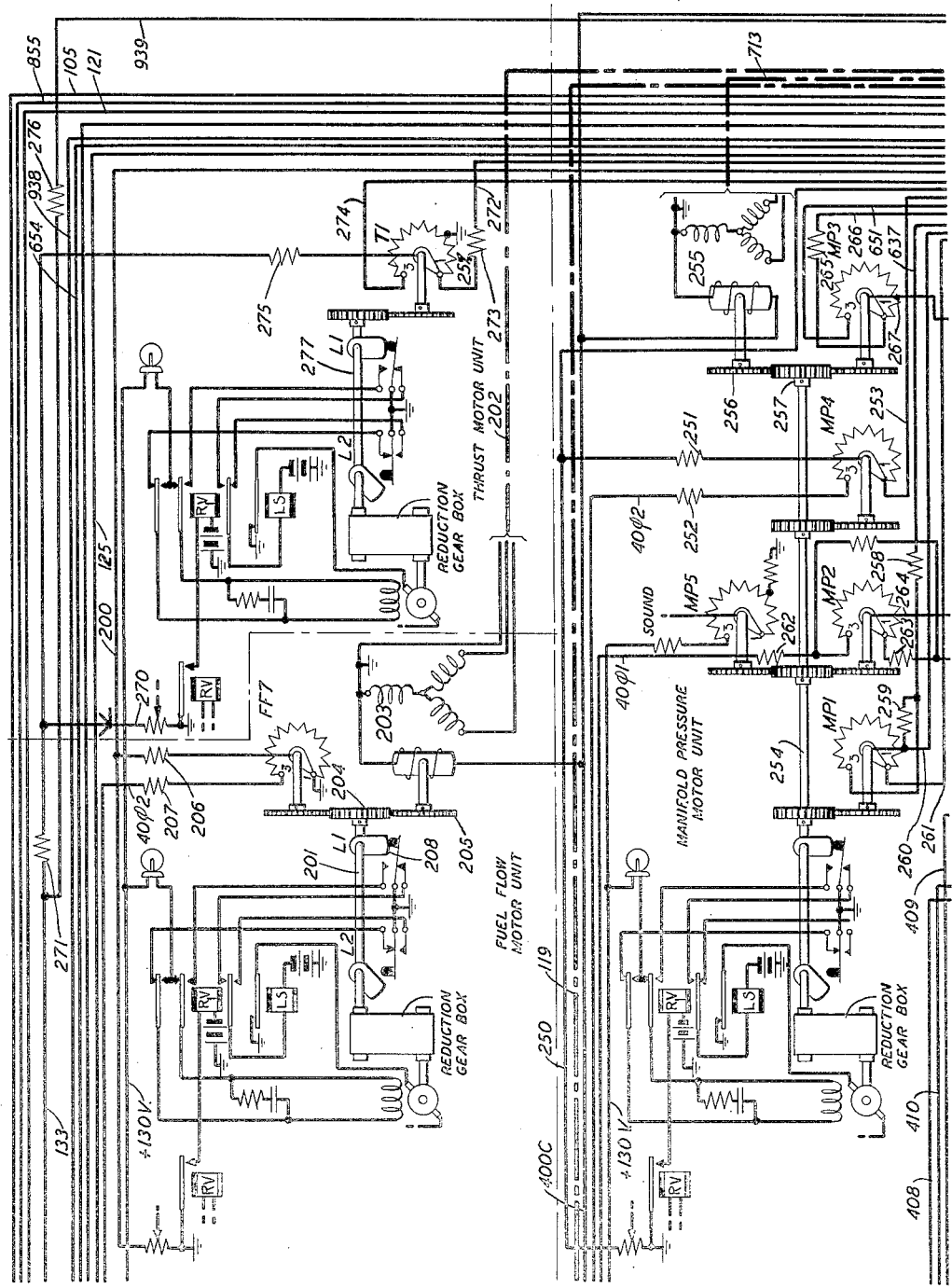
Figure 3:
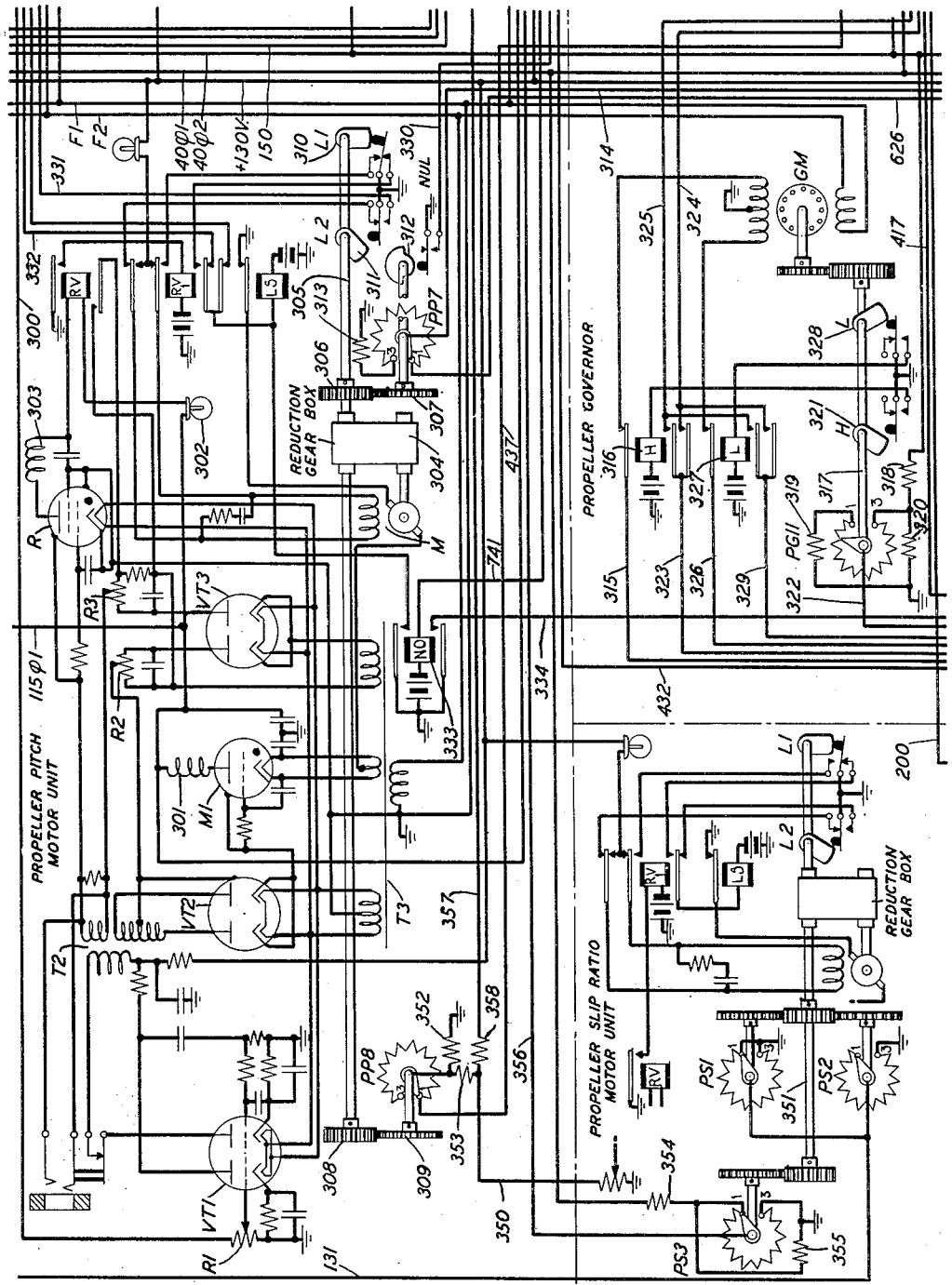

The thrust motor unit of Fig. 2 is controlled by signal potentials of phase $\varphi 1$ applied to its signal input conductor 270 from the propeller slip ratio, brake horse-power and cowl flaps circuits of all of the engine circuits of the trainer. Normally the sliders of the potentiometers of the thrust motor unit stand at the 25 per cent tapped points of their windings, the slider of the balancing potentiometer T1, for example, being at the grounded tapped point. In connection with the No. 1 engine circuit hereinbefore discussed, a potential of phase $\varphi 1$ was supplied to the winding of variac BH3 of the brake horse-power motor unit as soon as the shaft of that unit moved from normal and caused the operation of relay 122 as previously described. The potential thus derived at the slider of such variac, which varies directly with the simulated brake horse-power output of the engine, is then applied through resistor 130 and over conductor 131, and through potentiometers PS1 and PS2 in parallel to ground. The winding of potentiometer PS1 has both of its terminals connected to ground and the winding of potentiometer PS2 has one of its terminals connected to ground so that the joint effect of these two potentiometers is to vary the potential derived at the slider of the brake horse-power potentiometer BH3 approximately in accordance with the square of the cosine of the propeller slip ratio. The potential so modified is then applied from conductor 131 through resistor 132, over conductor 133 and through resistor 271 to the signal input conductor 270 of the thrust motor unit.

The thrust varies inversely as the true airspeed and therefore to introduce this factor, potential of phase $\varphi 2$ derived at the slider of variac TAS9 of the true airspeed motor unit is applied over conductor 272 and through resistor 273 to the No. 1 terminal of the winding of the balancing potentiometer T1 of the thrust motor unit and potential of phase $\varphi 1$ derived at the slider of variac TAS10 of the true airspeed motor unit is applied over conductor 274 to the No. 3 terminal of potentiometer P1. The 25 per cent tap of potentiometer P1 is connected to ground. The potential derived at the slider of T1 is applied through resistor 275 to conductor 270.

A potential of phase $\varphi 2$ which represents the drag factor introduced by the open position of the engine cowl flaps is also introduced to the thrust motor unit. This potential which will vary directly as the true airspeed is derived at the slider of the true airspeed variac TAS10 and is applied from the slider thereof over conductors 274 and 438, through resistor 935, through the winding of cowl flaps potentiometer CF3, shunted by resistor 936, through resistor 937 and over conductor 938 to ground at the inner lower front contact of the BHP-ON relay 122. And with the cowl flaps in any position except their full closed position, or when the slider of potentiometer CF3 would be at the No. 3 terminal of the potentiometer winding, phase $\varphi 2$ potential is thus applied from the slider of potentiometer CF3, over conductor 939 and through resistors 276 and 271 to signal input conductor 270 of the thrust motor unit.

In response to the summation of the potentials applied to conductor 270, not only in accordance with the operation of the No. 1 engine under consideration, but in accordance with the operation of the other simulated engines, the shaft 237 of the thrust motor unit is rotated to a position representative of the combined thrust of all of the engine driven propellers until through the movement of the slider of thrust potentiometer T1 the potential applied therefrom through resistor 275 balances the signal potential applied to conductor 270, through resistor 271.

In the event an engine becomes disabled and the propeller is not feathered, that engine will consume power from the other engines to keep it turning over by the windmilling propeller. This is introduced in the trainer through the release of the BHP-ON relay 122 when the disabling of the engine is simulated and by the PUL relay 653. When relay 122 releases, the winding of the brake horse-power variac BH3 no longer is energized by power from the phase $\varphi 1$ bus bar and consequently the signal potential of phase $\varphi 1$ applied from its slider to conductor 133 is cut off. At the same time, however, potential of phase $\varphi 2$ derived at the slider of the true airspeed variac TAS10 and applied over the circuit previously described through the winding of the cowl flaps potentiometer CF2 to conductor 938, is applied through resistor 652 and over the upper back contact of the PUL relay 653 thence over conductor 654 to ground at the inner lower back contact of relay 122. Thus the drag potential of phase $\varphi 2$ derived at the slider of potentiometer CF2 and applied through resistors 276 and 271 to the signal input conductor 270, of the thrust motor unit and which varies with the airspeed will be increased and, as a consequence, the thrust motor unit will be operated in a manner representative of the drag imposed by the windmilling of the propeller of the disabled engine.

Should the pilot now simulate the feathering of the windmilling propeller in the manner to be hereinafter described, resulting in the operation of the PUL relay 653, the 900-ohm resistor 652 would be eliminated from the circuit just traced over which the winding of the cowl flaps potentiometer CF2 was energized by the potential of phase $\varphi 2$ and consequently the drag potential applied to signal input conductor 270 from the slider of potentiometer CF2 would be reduced.

*Simulation of engine operation for climbing*

In an actual flight after the airplane becomes airborne the pilot gradually closes the throttles for climbing until the manifold pressure indicators show readings of about 43 inches of mercury. With the propeller pitch control switches still set for maximum RPM, the propeller governors would maintain the propeller speed at the take-off speed of 2800 RPM. This is too high a speed for climbing so the pilot then operates the propeller pitch control switches to their DEC positions until the tachometers show speeds of about 2600 revolutions per minute. The propeller governors will then maintain this engine speed.

In the trainer when the altimeter shows that a take-off has been accomplished the pilot first slowly closes the throttle of each engine thereby moving the sliders of the potentiometers TP1, TP2, TP3 and TP4 associated with the throttle towards the No. 1 terminals of their windings. The movement of the sliders of potentiometers TP1 and TP2 will result in a reduction of phase $\varphi 1$ potential applied to the signal input conductor 250 of the manifold pressure motor unit. This phase $\varphi 1$ potential will be further reduced as the flight gains altitude due to the movement of the slider of the altitude potentiometer A10. Under the control of the balancing potentiometer MP4 the shaft 254 of the manifold pressure motor unit will now be turned in a direction representative of a reduction of manifold pressure which reduction of pressure will be indicated by the manifold pressure indicators 716 and 816. When the indicators show a pressure of about 43 inches of mercury, the pilot ceases to close the throttle and the balancing potentiometer MP4 stabilizes the manifold pressure motor unit to maintain the indicated manifold pressure. At the same time the movement of the slider of throttle potentiometer TP4 has, together with the movement of the slider of the manifold pressure potentiometer MP1 decreased the phase $\varphi 1$ potential applied to the signal input conductor 400 of the RPM motor unit and to the signal input conductor 300 of the propeller pitch motor unit.

The decrease in potential of phase $\varphi 1$ applied to signal input conductor 300 of the propeller pitch motor unit causes the phase $\varphi 2$ potential applied as previously described from the slider of the propeller governor potentiometer PG11 to conductor 300, to become effective to rotate shaft 305 of the propeller pitch motor unit in a direction representative of the further increase in RPM whereby the slider of the propeller pitch potentiometer PP7 moves further toward the No. 1 terminal of its winding thereby increasing the phase φ1 potential applied therefrom to control conductor 300 until such potential balances the propeller governor potential of phase φ2. Then the propeller pitch motor unit will cease to function. The phase φ1 potential applied to signal input conductor 400 of the RPM motor unit although tending to be reduced as the throttle is closed to reduce the manifold pressure will be maintained by the propeller pitch potentiometer PP7 under the control of the propeller governor motor unit so that the RPM motor unit will not be operated in a manner representative of a reduction in engine speed and the tachometers 719 and 819 will still show an engine speed of 2800 revolutions per minute.

Since this is too high an engine speed for climbing with a manifold pressure of 43 inches of mercury, the pilot now moves the propeller pitch control switch 564 to its DEC position and holds it there until the tachometers show a decrease in engine speed to about 2600 revolutions per minute. When switch 564 is thus operated, relay 572 operates over an obvious circuit followed by the operation of the DEC relay 573. Relay 573 upon operating establishes a circuit from ground over its lower contacts, over conductor 326, over the upper back contact of the L relay 327 of the propeller governor motor unit and through the left shaded pole winding of the motor GM to ground. With the stator winding of this motor energized from the F1 and F2 bus bars, shaft 317 rotates at a slow speed in a direction representative of a decrease in propeller speed thereby moving the slider of potentiometer PG11 towards the No. 1 terminal of its winding and thereby reducing the phase φ2 potential applied as previously described from such slider to the input conductor 300 of the propeller pitch motor unit. The motor GM will thus continue to operate as long as the switch 564 is held in its DEC position by the pilot until the limit switch L causes the operation of the L relay 327.

With the phase φ2 potential applied to signal input conductor 300 reduced to a value less than the phase φ1 potential applied to such conductor from the slider of potentiometer PP7, the propeller pitch motor unit will now rotate its shaft 305 and the slider of potentiometer PP7 in a direction representative of a decrease in engine speed until the phase φ1 potential applied to conductor 300 from the slider of potentiometer PP7 balances the new value of phase φ2 potential determined by the new setting of the propeller governor motor unit. This reduction in phase φ1 potential also reduces the signal potential applied to the signal input conductor 400 of the RPM motor unit whereupon the phase φ2 potential applied to that conductor from the slider of the balancing potentiometer RP10 is effective to rotate the shaft 402 in a direction representative of a decrease in RPM until a potential balance on input conductor 400 is attained. The tachometers 719 and 819 will then have been controlled to show readings of 2600 revolutions per minute.

As the slider of the RPM potentiometer RP4 moves toward the No. 1 terminal of its winding representative of a reduction of engine speed, the phase φ1 potential applied therefrom to the signal input conductor 200 of the fuel flow motor unit, as previously described, becomes reduced and such motor unit will under the control of its balancing potentiometer FF7 be caused to rotate its shaft 201 in a direction representative of a decrease in fuel flow until the phase φ2 balancing potential balances the reduced phase φ1 signal potential. The fuel flow indicators 714 and 814 will now have been readjusted to show readings of 725 pounds of fuel flow per hour.

It may be noted at this time that if the propeller pitch control switch 564 should be held closed long enough, the motor GM of the propeller governor unit would rotate shaft 317 into a position in which cam 323 would close the contacts of limit switch L thereby operating the L relay 327. With the DEC relay 573 also operated a circuit is established from ground over the upper contacts of relay 573, over conductor 329, over the lower contacts of relay 327 and thence as previously traced through the Propeller limit lamps at the instructor's desk and at the pilot's position to battery. The pilot, noting the lighting of the lamp, will know that the propeller governor has operated to its decrease RPM limit and will open switch 564 to release relays 572 and 573 to stop the motor GM.

*Simulation of engine operation for cruising*

It will be assumed that when the altimeter shows a reading of 5,000 feet the pilot desires to level off the flight for cruising. For cruising the mixture control 515 is operated to the Auto lean position whereupon the previously traced circuit for the AR relay 559 is opened thereby extinguishing the Rich lamp at the instructor's desk and a circuit is established from battery through the winding of the AL relay 562, over the contact set operated by cam 517 in its normal position and to ground over the contact set operated by cam 516 in its alternate position. Relay 562, upon operating, establishes a circuit from ground over its inner lower contacts and conductor 528 of cable 532, and through the Lean lamp to battery at the instructor's desk to inform the instructor that the control has been operated to the Auto lean position.

The operation of relay 562 now derives potential of phase φ1 from a point between resistors 571 and 574 of the potential divider previously described and applies this potential over the circuit previously traced through the winding of manifold pressure potentiometer MP3, from which a potential is derived and applied to the signal input conductor 159 of the brake horse-power motor unit. This potential will be smaller than that previously applied before the operation of the AL relay 562, representative of the decrease in brake horse-power due to the change of the fuel mixture from automatic rich to lean. The decrease in the brake horse-power will result in a decrease in the signal potential applied to the signal input conductor 279 of the thrust motor unit under the control of the variac BH3 of the brake horse-power motor unit and the thrust motor unit will therefore be operated in a manner representative of a slight decrease in thrust.

A further result of the operation of the AL relay 562 is to cause a decrease in the indicated fuel flow to 290 pounds of fuel per hour, as will be indicated by the fuel flow indicators 714 and 814. This is accomplished by connecting the signal input conductor 200 of the fuel flow motor unit over the inner lower front contact of the LL relay 822 of the fuel pressure motor unit, over conductor 649, over the lower back contact of relay 609, over conductor 648 and over the inner upper front contact of relay 562 to a point between resistors 575 and 576 of the potential divider which extends as previously traced from the slider of potentiometer RP4, over conductor 432 and thence serially through resistors 576, 575 and 576 to ground.

The potential of phase φ1 now applied to signal input conductor 200 will be less than formerly applied and consequently the phase φ2 potential applied to conductor 200 from the slider of the balancing potentiometer FF7 will be effective to rotate the shaft 201 of the fuel flow motor unit to a position in which the phase φ2 potential balances the new value of the phase φ1 potential. In this position of the shaft 201 the fuel flow indicators will be reset to read 290 pounds of fuel flow per hour.

A still further result of the release of the AR relay 550 and the operation of the AL relay 562 is to cause an increase in the indicated oil and cylinder temperatures. It will be recalled that a potential of phase φ1 was derived at the slider of variac BH3 of the brake horse-power motor unit which varies directly as the assumed brake horse-power output of the engine and that this potential was applied over conductor 125 and through the serially connected resistors 558, 559, 560 and 561 to ground. With relay 562 now operated potential is now derived from a point between resistors 558 and 559 of this potential divider and applied over the lower front contact of relay 562 through resistor 563 to signal input conductor 914 of the cylinder and oil temperature motor unit. This potential will be of a higher value than the potential derived prior to the release of relay 550 and the operation of relay 562.

The pilot will also operate the cowl flaps control 800 to its closed position in which a circuit is established from ground thereover, over conductor 851 and through the C relay 983 of the cowl flaps motor unit. Relay 983 will thereupon operate and close a circuit over its contacts and over the normally closed contacts of contact set CL through the left shaded pole winding 940 of motor CFM whereupon the motor will rotate shaft 906 in a direction representative of the closing of the cowl flaps until cam 941 operates contact set CL to stop the motor. The cowl flaps indicators 749 and 849 will now indicate a closed condition of the cowl flaps and the slider of the cowl flaps potentiometer CF2 will be moved to the No. 1 terminal of its winding thereby increasing the phase φ1 potential applied from the slider thereof to control conductor 914 of the cylinder and oil temperature motor unit.

Consequently the motor of the cylinder and oil temperature motor unit will be operated in a direction representative of an increase in temperature until the phase φ2 potential applied to conductor 914 from the slider of balancing potentiometer BAL balances the increased value of phase φ1 potentials. In the new position of shaft 924 the oil temperature indicators 735 and 835 will be reset to show readings of 65 degrees centigrade and the cylinder temperature indicators 734 and 834 will be reset to show readings of 215 degrees centigrade.

A further result of the simulated closing of the cowl flaps is a reduction of the phase φ2 drag potential applied to the signal input conductor 270 of the thrust motor unit as determined by the movement of the slider of the cowl flaps potentiometer CF2 to the No. 1 terminal of its winding representative of the reduction in drag and consequent increase in thrust due to the closure of the engine cowl flaps.

The pilot to level off the flight first pulls the throttle back toward its closed position until the manifold pressure indicator 816 shows a manifold pressure of 32 inches of mercury. This is accomplished by the movement of the throttle potentiometers TP1 and TP2 toward the No. 1 terminals of their windings and the consequent reduction of potential of phase φ1 applied to signal input conductor 258 of the manifold pressure motor unit. Under the control of the balancing potentiometer MP4 the shaft 254 of this unit will now be turned in a direction representative of a reduction in manifold pressure which will be indicated by the manifold pressure indicators 716 and 816. When the indicators show a pressure of about 32 inches of mercury, the pilot ceases to close the throttle and the balancing potentiometer MP4 stabilizes the manifold pressure motor unit to maintain the indicated pressure. At the same time the movement of the slider of throttle potentiometer TP4 has, together with the movement of the slider of the manifold pressure potentiometer MP1, decreased the phase φ1 potential applied to the signal input conductor 400 of the RPM motor unit and to the signal input conductor 300 of the propeller pitch motor unit.

The decrease in potential of phase φ1 applied to signal input conductor 300 of the propeller pitch motor unit causes the phase φ2 potential applied as previously assumed from the slider of the propeller governor potentiometer PG11 to conductor 300 to become effective to rotate shaft 305 of the propeller pitch motor unit in a direction representative of a further increase in RPM whereby the slider of propeller pitch potentiometer PP7 moves further towards the No. 1 terminal of its winding thereby increasing the phase φ1 potential applied therefrom to control conductor 300 until such potential balances the propeller governor potential of phase φ2 when the propeller pitch motor unit will cease to function. The phase φ1 potential applied to signal input conductor 400 of the RPM motor unit although tending to be reduced as the throttle is closed to reduce the manifold pressure will be maintained by the propeller pitch potentiometer PP7 under the control of the propeller governor motor unit so that the RPM motor unit will not be operated in a manner representative of a reduction in engine speed and the tachometers 719 and 819 will still show an engine speed of 2600 revolutions per minute.

Since this is too high an engine speed for cruising with a manifold pressure of 32 inches of mercury the pilot moves the propeller pitch control switch 584 to its DEC position and holds it there until the tachometers show a decrease in engine speed to about 1900 revolutions per minute. The reduction in RPM is brought about in response to the operation of the propeller pitch control through the operation of the propeller governor motor unit and propeller pitch motor unit in the manner previously described.

*Simulation of supercharger blower control*

It will now be assumed that the simulated flight is being made at an altitude at which to maintain the power output of the engine, the supercharger blowers should be operated at their high speed. The pilot thereupon operates the supercharger control switches to their high positions. The operation of the supercharger blower control 554 for the No. 1 engine to its H position releases the previously operated LR and SHL relays 577 and 439 and extinguishes the previously lighted lamp (not shown) at the instructor's desk indicative of the low speed operation of the supercharger blower. With the control 554 in its H position an obvious circuit is established for the HR relay 579 which establishes a circuit (not shown) for lighting a lamp at the instructor's desk indicative of the operation of the control to its H position and establishes a circuit from ground over the contacts of the SC relay 512, over the contacts of relay 570, over conductor 568, and over the upper normal contacts and through the winding of the SHR relay 419 of the RPM motor unit to battery. Relay 419 thereupon operates and locks over its upper alternate contacts to ground over the normal contacts of the SHL relay 439 whereby relay 419 is maintained operated even though the control 554 is restored to its neutral position until such control is moved to its L position and relay 439 is thereby operated.

With the SHR relay 419 operated the phase $\varphi 1$ potential derived at the slider of the throttle potentiometer TP1, which increases as the throttle opens and decreases as the altitude of the simulated flight increases and is applied over the lower and inner upper contacts of relay 419 across the winding of the RPM potentiometer RP3, is increased when relay 419 operates by the substitution of the 1900-ohm resistor 440 for the 3100-ohm resistor 421 and by the elimination of the 1510-ohm resistor 418, with the result that there is an increase of the phase $\varphi 1$ potential applied from the slider of potentiometer RP3 to signal input conductor 250 of the manifold pressure motor unit. The latter unit thereupon functions in the manner previously described to reset the manifold pressure indicators 716 and 816 to show an increase of manifold pressure to 34.5 inches of mercury.

At its inner lower contacts relay 419 also inserts resistor 436 in the circuit from the slider of the manifold pressure potentiometer MP3, over conductor 267 and through resistors 433 and 436 in series to the slider of the RPM potentiometer RP8 whereupon there is a reduction in the phase $\varphi 1$ potential applied to the signal input conductor 150 of the brake horse-power motor unit and such unit responds in a manner representative of a reduction in brake horse-power output of the engine due to the consumption of power in driving the supercharger blower at its high speed.

*Simulated disabling of the engine*

The instructor may simulate the disabling of the engine by operating the Disable engine key at his desk thereby opening the previously traced circuit for the EST relay 625 of the engine control circuit and which thereupon releases in turn releasing the EST1 relay 612 and the EST2 relay 615. With the EST1 relay 612 now released the circuit previously traced from the slider of the RPM potentiometer RP3 over conductor 422, over the middle upper front contact of relay 612 and through resistor 614 to signal input conductor 250 of the manifold pressure motor unit, over which phase $\varphi 1$ potential was applied under control of the throttle potentiometer TP1, is opened and a new circuit is established from conductor 422 over the upper back contact of the PUL1 relay 549, over conductor 655, over the inner upper front contacts of the AS relay 613 which will be operated if the assumed airspeed is over 50 knots, over the upper back contact of relay 612 and through resistor 614 to signal input conductor 250. The circuit previously traced from signal input conductor 250 through resistor 635, over the inner upper front contact of relay 612 and conductor 425 to the slider of the RPM potentiometer RP2, and over which phase $\varphi 1$ potential was applied to conductor 250 under the control of the throttle potentiometer TP2 is now opened but conductor 250 is still maintained connected over the inner upper back contact of relay 612, over the lower front contact of the AS relay 613, over the lower back contact of the PUL relay 653 and thence to conductor 425. The manifold pressure motor unit is therefore maintained in the previous condition whereby no decrease in manifold pressure is indicated since the propeller will be windmilling and turning over the engine at the speed determined by the propeller governor.

The release of the EST2 relay 615 establishes a substitute path from the $40\varphi 1$ bus bar to conductor 637, over which phase $\varphi 1$ potential was applied through the winding of the manifold pressure potentiometer MP1, which may be traced from the $40\varphi 1$ bus bar over the next to inner upper contacts of relay 613 to conductor 637. But the phase $\varphi 1$ potential previously applied from the slider of potentiometer MP1 over conductor 260 and over the inner lower front contacts of the EST relay 625 and over conductor 626 is now applied from conductor 260 over the inner upper back contact of relay 625, over the inner lower back contact of the STM1 relay 618 and through the potential divider resistors 623 and 624 to ground whereby the potential of phase $\varphi 1$ now derived at the junction point between resistors 623 and 624 and applied over the inner lower back contact of relay 625 and thence over conductor 626 to the propeller pitch potentiometer PP7 is reduced in value. The phase $\varphi 1$ potential now applied from the slider of potentiometer PP7 over conductor 314, over the lower back contact of the PUL1 relay 549, over conductor 656, over the next to inner lower front contact of the AS relay 613, over the lower back contact of the EST relay 625, over conductor 629 and through resistor 401 to signal input conductor 400 of the RPM motor unit now tends to become reduced in value. However, at the same time the reduced potential at the slider of potentiometer PP7 becomes applied, as previously described, to the signal input conductor 300 of the propeller pitch motor unit.

Since at this time the propeller governor has been set to a position to maintain the engine RPM at 1900 revolutions per minute, the reduced value of phase $\varphi 1$ potential now applied to conductor 300 is less than the phase $\varphi 2$ potential applied to conductor 300 from the slider of the propeller governor potentiometer PG11 and as a consequence the propeller pitch motor unit is controlled by the predominating phase $\varphi 2$ potential to drive the shaft 305 in a direction representative of a decrease in propeller pitch whereby the slider of propeller pitch potentiometer PP7 is driven toward the No. 1 terminal of its winding to increase the phase $\varphi 1$ potential applied to conductor 300 until it balances the phase $\varphi 2$ propeller governor potential. The phase $\varphi 1$ potential applied from the slider of potentiometer PP7 to the signal input conductor of the RPM motor unit is also thereby increased so that the RPM motor unit is not affected to change the indicated RPM. This simulates the operation of the propeller governor of an actual airplane to decrease the propeller pitch so that it will windmill at the same speed as it formerly rotated under engine power or at 1900 revolutions per minute. If, however, the slider of potentiometer PP7 reaches the No. 1 terminal of its winding and the potential of phase $\varphi 1$ derived therefrom still fails to balance the phase $\varphi 2$ governor potential, the cam 311 of the propeller pitch motor unit will operate the L2 limit switch to stop the motor 304 and the phase φ1 potential being still less than that supplied from the slider of the balancing potentiometer RP10 of the RPM motor unit, the shaft of the latter unit will be operated into a position representative of a decrease in RPM below 1900.

A further result of the release of the EST relay 625 is the removal of potential from the winding of manifold pressure potentiometer MP3 whereupon the phase φ1 potential applied from the slider of such potentiometer to the signal input conductor 150 is removed. There will be at this time a small phase φ1 signal potential applied to conductor 150 from the slider of the altimeter potentiometer A9 but due to the insertion of the 410-ohm resistor 153 between the No. 1 terminal of this winding of potentiometer BH2 and ground, the balancing potential of phase φ2 derived at the slider of potentiometer BH2 will overbalance the small phase φ1 potential even when such slider reaches the No. 1 terminal of the potentiometer winding. The phase φ2 potential applied to signal input conductor 150 from the slider of the balancing potentiometer BH2 is now effective to cause the shaft 123 to turn in a direction representative of a reduction in brake horse-power until the cam 124 operates the L1 limit switch to release the BHP-ON relay 122 and to stop the motor. With relay 122 released potential is disconnected from the winding of variac BH3 and thereby from conductor 133 connected through resistor 271 to the signal input conductor 270 of the thrust motor unit so that no phase φ1 potential is applied to conductor 270 from the brake horse-power unit of the disabled engine.

At the same time relay 122 upon releasing reduces the potential applied across the winding of the cowl flaps potentiometer CF2 whereby, as previously described, a drag potential of phase φ2 is applied from the slider of potentiometer CF2 over conductor 939 and through resistors 276 and 271 to conductor 270 representative of the consumption of power from the other engines by the windmilling effect of the propeller of the dead engine.

*Simulation of feathering the propeller*

To feather the propeller of the dead engine, the pilot operates the Prop feathering switch appertaining to such engine thereby establishing a circuit from battery, over its outside contacts and through the winding of the pump switch (PS) relay 543 which, in operating, simulates the operation of the oil pressure pump which functions to feather the propeller blades. The switch is locked in its operated position over a circuit from battery over its contacts, through the solenoid winding, over the upper contacts of the F relay 581, which operated in response to the operation of the FTH circuit breaker relay 513, thence to ground at the inner upper back contact of the ULL relay 582. Relay 543, upon operating, establishes a circuit from ground over its middle upper contacts and conductor 529 of cable 532, through the Feather lamp at the instructor's desk to battery to inform the instructor that the pilot has operated the feathering switch.

In addition, relay 543 opens the short circuit of the condenser 541, which extends through resistor 542, over the middle upper back contact of the STO1 relay 540 and over the lower back contact of the relay 543 to ground, whereupon the condenser starts to charge over a circuit from ground therethrough, through resistors 542 and 544 and over the upper normal contacts of the PM relay 545 to the +130-volt bus bar. The condenser charges in about three seconds to the breakdown potential of tube GT. The tube will then fire and establish a circuit from ground over its anode-cathode path and through the lower winding of relay 545 to the +130-volt bus bar whereupon relay 545 operates to close a locking circuit for itself from battery through its upper winding and upper contacts, over the upper back contact of relay 549, over the upper contacts of relay 543 and to ground over the normal contacts of the LK relay 583. At its normal contacts relay 545 opens the cathode-anode path through the tube GT thereby extinguishing the tube and at its lower contacts establishes a circuit from ground over the lower contacts of relay 543, over the inner lower back contact of relay 540, over the lower contacts of relay 545, over the inner upper back contact of relay 549, over the lower back contact of the ULL relay 582 and over conductor 957 through the winding of the FTR relay 644 to battery. Relay 644 closes a circuit from ground over its upper contacts, conductor 658 and over the upper back contact of relay 582, through the winding of relay 583 to battery, whereupon relay 583 operates and opens the circuit of the TM relay 545 which thereupon releases. Relay 644 is held operated following the release of relay 545, over a locking circuit extending from battery through its winding, over its inner lower contacts, over the upper back contact of the UF relay 643, over conductor 659 and to ground over the inner lower contacts of the operated relay 543.

Relay 644, upon operating, applies potential of phase φ1 derived from the potential divider comprising resistors 619 and 620, over its inner upper front contact and through resistor 645 to signal input conductor 300 of the propeller pitch motor control circuit; opens the circuit over which phase φ2 potential has been applied from the slider of the propeller governor potentiometer PG11, through resistor 647 to conductor 300 and connects resistor 647 over its lower front contact to ground. With a phase φ1 potential now applied to conductor 300 and phase φ2 potential removed therefrom, the propeller pitch motor unit now functions to rotate its shaft 395 until cam 311 operates the L2 limit switch to stop the motor M. But before the motor stops the cam 312 operates the NUL switch thereby establishing a circuit from ground over its contacts, over conductor 330 and through the winding of the NUL relay 660 to battery. Relay 660 upon operating establishes a circuit from ground over the next to inner upper contacts of relay 644, over the upper contacts of relay 660, over conductor 661 and through the winding of the FP relay 568 to battery whereupon relay 568 locks over its inner upper contacts and conductor 662 to ground over the lower contacts of relay 660. If the feathering operation is interrupted from this point due to the feathering switch being pulled out or for some other reason, relay 568 will keep the propeller pitch motor unit in its condition of fixed pitch since if the FTR relay 653 should release due to the release of the PS relay 543, ground potential will be applied over the upper front contact of relay 568, over conductor 642, over the inner upper back contact of relay 643, over the inner upper back contact of relay 644 and through resistor 645 to signal input conductor 300 of the propeller pitch motor unit and ground potential will be applied over the lower front contact of relay 568, over conductor 569, over the inner lower back contact of relay 643, over the inner lower back contact of relay 644 and through resistor 647 to conductor 300.

When the upper limit of the propeller pitch shaft 305 is reached and cam 311 operates the L2 limit switch, a circuit is closed from ground thereover, over conductor 331 and through the winding of the PUL relay 653 to battery. Relay 653 upon operating establishes a circuit from ground over its inner lower contacts and conductor 663 through the winding of the PUL1 relay 549 to battery, and establishes a circuit from ground over its middle lower contacts and conductor 664 through the winding of the ULL relay 582 to battery. At its middle upper contacts relay 653 also establishes a circuit from ground, over conductor 332, over the inner lower back contact of the RV1 relay of the propeller pitch motor unit and through the winding of the LS relay of such unit whereupon relay LS operates to open the rotor circuit of the motor M.

The ULL relay 582 upon operating opens the circuit of the LK relay 583 and opens the circuit of the holding solenoid of the Prop feathering switch which now releases and in turn releases relay 543 to extinguish the Feather lamp at the instructor's desk and to release the FTR relay 644. A circuit is now established from battery through the winding of the PUL2 relay 584, over the upper back contact of relay 543 and to ground at the inner lower front contact of relay 549.

Following the operation of the PUL relay 653, resistor 652 is disconnected at the upper back contact of that relay from the circuit previously traced from ground at the inner lower back contact of the BHP–ON relay 122 of the brake horsepower unit, over conductor 654, through resistor 652 and over conductor 938 to the No. 1 terminal of the winding of potentiometer CF2 and ground on conductor 654 is now applied directly to conductor 938 so that with the slider of potentiometer CF2, now at the No. 1 terminal of its winding representative of closed cowl flaps, the phase φ2 drag potential representative of the negative thrust of the windmilling propeller is entirely removed from conductor 133 and thence from the signal input conductor 270 of the thrust motor unit.

Relay 653 also establishes a circuit from ground over its lower front contact, over the lower front contact of the AS relay 613, over the inner upper back contact of the EST1 relay 612 and through resistor 653 to the signal input conductor 250 of the manifold pressure motor unit in place of the signal input circuit which was under the control of the throttle potentiometer TP2. The PUL1 relay 549 upon operating establishes a circuit from the slider of the altimeter potentiometer A10, over conductor 105, over the upper front contact of relay 549, over conductor 655, over the inner upper front contact of relay 613, over the upper back contact of relay 612 and through resistor 614 to conductor 250 in place of the signal input circuit which was under the control of the throttle potentiometer TP1. As a result, the phase φ1 potential applied to the slider of the altimeter potentiometer A10, causes the manifold pressure motor unit to be controlled to cause the manifold pressure indicators 716 and 816 to show the barometric pressure at the assumed altitude at which the flight is being conducted.

Relay 549 at its lower back contact opens the previously traced circuit over which phase φ1 potential was applied from the slider of the propeller pitch potentiometer PP7, under the control of the throttle potentiometer TP4 to the signal input conductor 400 of the RPM motor unit and substitutes a direct ground therefor. The RPM motor unit will now, under the control of the RP10 potentiometer, operate its shaft 402 to a position representative of a reduction of the engine speed to zero. The cam 406 will now operate the limit switch L1 to the position shown thereby releasing the ON relay 407 and stopping the motor of the unit. The tachometer motor unit will now reset the tachometers 719 and 819 to show a zero engine speed.

The ON relay 407, upon releasing, also releases the RPM relay 630 of the engine control circuit and the RPM relay 820 of the engine oil pressure motor unit. Relay 820, upon releasing, opens at its inner lower contacts the locking circuits for relays 823 and 824 which now release and closes a circuit from ground over the contacts of the L1 limit switch, now closed, over the back contact of relay 820 and through the winding DOP relay 848 to battery. Relay 848 now operates and establishes a circuit over its front contacts, over the back contacts of relay 825, through the rotor circuit of motor OPM and through a portion of the secondary winding of transformer T8 whereby the motor turns the shaft 826 at a slow speed in a direction representative of a reduction of oil pressure until the cam 850 opens the contacts of the L1 limit switch and opens the circuit of relay 848. The motor OPM will now stop. Under the control of the synchro-transmitter 830, the oil pressure indicators 733 and 833 will now have been set to show an oil pressure of zero pounds per square inch.

When relay 820 releases the holding circuit of the ST relay 803 of the fuel pressure motor unit becomes opened at the lower contacts of relay 820 and, assuming that the BP relay 802 which simulates the operation of the booster pump which supplies fuel under pressure to the No. 1 engine is not operated, relay 803 releases and establishes a circuit from ground over its back contact, over the upper contacts of relay 822 and through the winding of the DFP relay 852 to battery. Relay 852 thereupon establishes a circuit over its front contacts, over the back contact of relay 805 and through a portion of the secondary winding of transformer T8 so that the motor FPM of the fuel pressure motor unit turns the shaft 806 in a direction representative of a decrease in fuel pressure until cam 821 opens the contacts of the LL switch. Relay 822 will thereupon release and open the circuit of relay 852 to stop the motor. Through the operation of the synchro-transmitter 810, the fuel pressure indicators 712 and 812 will now show a zero fuel pressure.

Relay 822 upon releasing now opens the circuit over which phase φ1 signal potential, as determined by the altimeter variac A7 and by the RPM potentiometer RP4, was delivered to the signal input conductor 200 of the fuel flow motor unit and connects conductor 200 directly to ground over the inner lower and inner upper back contacts of relay 822. The fuel flow motor unit is now controlled by the phase φ2 potential applied to conductor 200 from the slider of its balancing potentiometer FF7 to turn its shaft 201 in a direction representative of a reduction in fuel flow until the cam 208 moves the L1 limit switch into the position shown to stop the motor. The synchro-transmitter 203 will now have controlled the fuel flow indicators 714 and 814 to show a fuel flow of zero pounds per hour to the disabled engine.

*Simulation of unfeathering the propeller*

To unfeather the propeller the pilot again operates the Prop feathering switch and holds it operated manually. The PS relay 543 again operates and through the charging of condenser 541 and the firing of tube GT the TM relay 545 is again operated after an elapse of about three seconds. Relay 545 upon operating now establishes a circuit from ground over the lower contacts of relay 543, over the inner lower back contact of relay 540, over the lower contacts of relay 545, over the inner upper back contact of relay 540, over the lower front contact of the ULL relay 582, now operated, over conductor 665 and through the winding of the UF relay 643 to battery. Relay 643 now operates and locks over its inner lower front contact and conductor 666 to ground at the lower contacts of relay 543. Relay 643, upon operating, establishes a circuit from ground over its upper contacts, over conductor 667 and over the upper front contact of relay 582, through the winding of the LK relay 583 to battery which operates and opens the locking circuit of relay 545 which releases, relay 545 in turn opening the initial operating circuit of relay 643.

At its middle lower front contact relay 643 establishes a circuit from ground over the middle lower back contact of relay 644 and through resistor 647 to the signal input conductor 300 of the propeller pitch motor unit and connects potential of phase φ2 derived from the junction point between resistors 668 and 669, over its inner upper front contact and over the inner upper back contact of relay 644, through resistor 645 to conductor 300. Under the control of this potential the propeller pitch motor unit now rotates its shaft 305 at a slow speed in a direction representative of a decrease of propeller pitch until the cam 310 operates the limit switch L1 when the minimum pitch position is reached and the motor M will stop. When the cam 311 moves away from the upper limit switch L2 the circuit of the PUL relay 653 is opened and such relay releases in turn releasing the PUL1 and PUL2 relays 549 and 584. When the shaft 305 turns, the normal upper limit cam 312 permits the contact set NUL to open thereby releasing the NUL relay 660 which opens the locking circuit of the FP relay 568, thereby permitting the release of the latter relay. The Prop feathering switch may now be released thereby permitting the release of relay 543 in turn releasing relays 643 and 582. With relays 643, 644 and 568 now released, the signal input conductor 300 of the propeller pitch motor unit is now connected over the previously traced circuit to the slider of the propeller governor potentiometer PG11 and to the slider of the propeller pitch potentiometer PP7 so that the propeller pitch motor unit is restored to the propeller governor control and phase φ1 potential will again be applied to the signal input conductor 400 of the RPM motor unit.

The RPM motor unit will now be controlled in the manner previously described to operate its shaft 402 into a position representative of an engine speed of 1900 revolutions per minute, since the propeller governor motor unit was previously operated into a position representative of a propeller pitch which would maintain that engine speed. When the shaft 402 moves, the ON relay 407 reoperates in turn causing the reoperation of the RPM relays 630 and 820 in the engine control circuit and in the oil pressure unit and causes the tachometer motor unit to control the resetting of the tachometers 719 and 819 to show an engine speed of 1900 revolutions per minute. In response to the reoperation of relay 820, the engine oil pressure unit reoperates to cause an indication of engine oil pressure and the fuel pressure motor unit reoperates to cause the indication of fuel pressure in the manner previously described.

If the instructor has in the meantime restored the Disable engine key, with the RPM relay 630 now operated the circuit of the EST relay 625 is reestablished from ground applied to conductor 631 over contacts of relays 601 and 602, assuming that the ignition switch 520 is still in the Both position, over contacts of the key, over conductor 632, over contacts of relay 822 of the fuel pressure motor unit which reoperated upon the operation of such motor unit to show a reestablishment of fuel pressure, over conductor 818, over the upper back contact of the ICO1 relay 633, over the lower contacts of relay 630 and through the winding of relay 625 to battery. Relay 625 thereupon operates followed by the operation of the EST1 and EST2 relays 612 and 615. The engine circuits now function in the manner described prior to the disabling of the engine.

*Simulation of loss of oil in the propeller feathering control system*

To simulate the loss of oil in the system which operates the propeller feathering motor, the instructor operates the Propeller oil key thereby establishing a circuit from ground thereover, over conductor 741 and through the no oil (NO) relay 333 of the propeller pitch motor unit. Relay 333 upon operating closes the circuit of the LS relay of the motor unit which operates to prevent the motor M from operating and closes a circuit from ground over its lower contacts, over conductor 334 and the middle upper back contact of relay 540 in shunt of condenser 541. Consequently, if the pilot attempts to feather the propeller by operating the Prop feathering switch the tube GT will not fire to operate relay 545 and no circuit will therefore be established for the FTR relay 644. The feathering switch will therefore not release. Since relay 644 has not operated, the RPM motor unit will not function to change the indicated engine speed and the propeller pitch motor unit will not operate to change the propeller pitch.

*Simulation of propeller governor failure*

To simulate the failure of the propeller governor, the instructor operates the propeller pitch key at his desk thereby establishing a circuit from ground thereover, over conductor 530 of cable 532 and through the winding of the PGF relay 567 to battery. Relay 567 upon operating connects ground over its lower contacts, over the lower back contacts of relay 568, over conductor 569, over the middle lower back contacts of relays 643 and 644 and through resistor 647 to the signal input conductor 300 of the propeller pitch motor unit in place of the phase φ1 potential previously applied under the control of the propeller pitch potentiometer PP7 and connects phase φ2 potential from the potential divider comprising resistors 668 and 669, over conductor 670, over the upper front contact of relay 567, over the upper back contact of relay 568, over conductor 642, over the inner upper back contacts of relays 643 and 644 and through resistor 645 to signal input conductor 300. In response to this phase φ2 potential the propeller pitch motor unit rotates the shaft 305 into a position representative of a minimum propeller pitch.

*Simulation of change of carburetor air from direct to filtered or alternate*

Should the pilot operate the Carburetor air switch 585 from the Direct to either the FILT or ALT position, the FIL relay 553 will operate provided the CARB circuit breaker relay 511 has been operated. The operation of relay 553 introduces the 500-ohm resistor 586 into the circuit previously traced to the slider of the TP1 throttle potentiometer whereby the phase φ1 potential applied under the control of the potentiometer TP1 to signal input conductor 250 of the manifold pressure unit is reduced so that this unit will be controlled to show about a 5 per cent decrease in manifold pressure.

What is claimed is:

1. In an aircraft trainer wherein the operation of an airplane engine is simulated, a source of current, a control conductor, means for simulating the brake horse-power output of an engine, means operated by said latter means for deriving a potential from said source and for applying it to said conductor which potential varies directly as the simulated horse-power, means for simulating the operation of the engine cowl flaps, means for simulating the true air speed of a simulated flight, means controlled by said two latter means for deriving a potential from said source opposite in potential to said first potential and for applying it to said conductor, such latter potential varying with the simulated position of the engine cowl flaps and with the true airspeed of the simulated flight, means controlled by said true air speed simulating means for deriving a potential from said source which varies with the true airspeed of the simulated flight, a balancing potentiometer for modifying said latter potential and for applying it to said conductor, a motor responsive to an unbalanced potential condition on said conductor for adjusting said balancing potentiometer until the sum of the potentials applied to said conductor becomes zero, and means operated by said motor in accordance with the thrust output of the simulated engine.

2. In an aircraft trainer wherein the operation of an airplane engine is simulated, a source of current, a control conductor, means for simulating the brake horse-power output of an engine, means operated by said latter means for deriving a potential from said source and for applying it to said conductor which potential varies directly as the simulated brake horse-power, means for simulating the operation of the engine cowl flaps, means for simulating the true air speed of a simulated flight, means controlled by said true air speed simulating means for deriving potentials of opposite phase from said source which vary in accordance with the true airspeed of the simulated flight, means controlled by said cowl flaps simulating means for modifying that one of the latter potentials which is opposite in phase to said first potential in accordance with the simulated position of the engine cowl flaps and for applying said modified potential to said conductor representative of the drag effect of the cowl flaps, a balancing potentiometer to the end terminals of whose winding said oppositely phased potentials derived in accordance with the simulated airspeed are applied and to an intermediate terminal of which winding ground potential is connected, whereby a balancing potential of one or the other phase which varies with the true airspeed is derived and applied to said conductor, a motor responsive to an unbalanced potential condition on said conductor for adjusting the balancing potentiometer until the sum of the potentials applied to said conductor becomes zero, means effective in the simulation of a disabled engine to discontinue said first potential and to augment said drag potential whereby said motor is controlled by said balancing potential in a manner representative of the negative thrust produced by a dead engine whose propeller is windmilling.

3. In an aircraft trainer wherein the operation of an airplane engine is simulated, a source of current, a control conductor, means for simulating the brake horse-power output of an engine, means operated by said latter means for deriving a potential from said source and for applying it to said conductor which potential varies directly as the simulated brake horse-power, means for simulating the operation of the engine cowl flaps, means for simulating the true air speed of a simulated flight, means controlled by said true air speed simulating means for deriving potentials of opposite phase from said source which vary in accordance with the true airspeed of the simulated flight, means controlled by said cowl flaps simulating means for modifying that one of the latter potentials which is opposite in phase to said first potential in accordance with the simulated position of the engine cowl flaps, a balancing potentiometer to the end terminals of whose windings said oppositely phased potentials derived in accordance with the simulated airspeed are applied and to an intermediate terminal of whose winding ground potential is connected whereby a balancing potential of one or the other phase which varies with the airspeed is derived and applied to said conductor, a motor responsive to an unbalanced potential condition on said conductor for adjusting said balancing potentiometer until the sum of the potentials applied to said conductor becomes zero, means effective in the simulation of a disabled engine to discontinue said first potential and to augment said drag potential whereby said motor is controlled by said balancing potential in a manner representative of the negative thrust produced by a dead engine whose propeller is windmilling, and means operable in simulation of the feathering of the propeller blades to reduce said drag potential whereby said motor is controlled by said balancing potential in a manner representative of the zero thrust produced by a dead engine whose propeller is feathered.

4. In an aircraft trainer wherein the operation of an airplane engine is simulated, a source of current, a control conductor, means for simulating the brake horse-power output of an engine, means operated by said latter means for deriving a potential from said source and for applying it to said conductor which potential varies directly as the simulated brake horse-power, means for modifying said potential in accordance with the square of the simulated propeller slip ratio, means for simulating the operation of the engine cowl flaps, means for simulating the true air speed of a simulated flight, means controlled by said two latter means for deriving a potential from said source opposite in phase to said first potential and for applying it to said conductor, said latter potential varying with the simulated position of the engine cowl flaps and with the true airspeed of the simulated flight, means controlled by said true air speed simulating means for deriving a potential from said source which varies with the true airspeed of the simulated flight, a balancing potentiometer for modifying said latter potential and for applying it to said conductor, a motor responsive to the unbalanced potential condition on said conductor for adjusting the balancing potentiometer until the sum of the potentials applied to said conductor becomes zero, and means operated by said motor in accordance with the thrust output of the simulated engine.

5. In an aircraft trainer wherein the operation of an airplane engine is simulated, a source of current, a control conductor, a simulated throttle control, means responsive to said throttle control for deriving a potential from said source and for applying it to said conductor which varies in accordance with the simulated throttle opening, a motor operable in response to said potential, a simulated manifold pressure indicator for indicating a simulated manifold pressure, means controlled by said motor for operating the indicator to show a manifold pressure which varies with the simulated throttle opening, a simulated carburetor air control, a relay responsive to said latter control representative of a simulated change in the carburetor air supply from direct to filtered or alternate, and means controlled by said relay for reducing said derived potential whereby said motor controls said indicator to show a reduction of manifold pressure representative of the reduction in manifold pressure incident to the use of filtered or alternate carburetor air.

6. In an aircraft trainer wherein the operation of an airplane engine is simulated, a source of current, a control conductor, a simulated throttle control, means responsive to said throttle control for deriving a potential from said source and for applying it to said conductor which varies in accordance with the simulated throttle opening, a balancing potentiometer for deriving a potential from said source and for applying it to said conductor, a motor operable in response to an unbalanced potential condition on said conductor for adjusting said potentiometer until the sum of the potentials applied to said conductor becomes zero, a simulated manifold pressure indcator for indicating a simulated manifold pressure, means controlled by said motor for operating said indicator to show a manifold pressure which varies wth the simulated throttle opening, a simulated carburetor air control, a relay responsive to said latter control representative of a change in the simulated carburetor air supply from direct to filtered or alternate, and means controlled by said relay for reducing said first derived potential whereby said motor controls said indicator to show a reduction of manifold pressure representative of the reduction in manifold pressure incident to the use of filtered or alternate air.

7. In an aircraft trainer wherein the operation of an airplane engine is simulated, a source of current, a control conductor, a simulated throttle control, means operable by said throttle control for deriving a potential from said source and for applying it to said conductor, a simulated propeller pitch control, a motor operable in response to said latter control in simulation of the operation of the propeller governor of an airplane, means operable by said motor for deriving a potential from said source opposite in phase to said first derived potential and for applying it to said conductor, a motor responsive to the summation of the potentials applied to said conductor, and means controlled by said latter motor to change the value of said first potential until it balances said second potential, representative of the adjustment of the pitch of the propeller blades of an airplane in response to the operation of the propeller governor to attain a propeller speed determined by the throttle setting.

8. In an aircraft trainer wherein the operation of an airplane engine is simulated, a simulated throttle control, a simulated manifold pressure indicator, means responsive to said throttle control for controlling said indicator to show a desired value of manifold pressure, a source of current, a control conductor, means operable by said throttle control for deriving a potential from said source and for applying it to said conductor which varies in accordance with the simulated manifold pressure, a simulated propeller pitch control, a motor operable in response to said latter control in simulation of the operation of the propeller governor of an airplane, means operable by said motor for deriving a potential from said source opposite in phase to said first derived potential and for applying it to said conductor, a motor responsive to the summation of the potentials applied to said conductor, and means controlled by said latter motor to change the value of said first potential until it balances said second potential representative of the adjustment of the pitch of the propeller blades of an airplane in response to the operation of the propeller governor to attain a propeller speed commensurate with the indicated manifold pressure.

9. In an aircraft trainer wherein the operation of an airplane engine is simulated, a simulated throttle control, a simulated tachometer, means responsive to said throttle control for controlling said tachometer to show the simulated speed of an engine, a source of current, a control conductor, means operable by said throttle control for deriving a potential from said source and for applying it to said conductor which varies in accordance with the simulated throttle opening, a simulated propeller pitch control, a motor operable in response to said latter control in simulation of the operation of the propeller governor of an airplane, means operable by said motor for deriving a potential from said source opposite in phase to said first derived potential and for applying it to said conductor, a balancing potentiometer, a motor responsive to the summation of the potentials applied to said conductor for adjusting said balancing potentiometer to change the value of said first potential until it balances said second potential representative of the adjustment of the pitch of the propeller blades of an airplane in response to the operation of the propeller governor, and means for applying a derivation of said first potential as determined by said balancing potentiometer to control said tachometer controlling means whereby said tachometer is operated to show a simulated engine speed determined by propeller governor simulating means.

10. In an aircraft trainer wherein the operation of an airplane engine is simulated, a simulated throttle control, a simulated tachometer for indicating the simulated engine speed, a source of current, a control conductor, means for simulating the manifold pressure of an engine, means controlled by said throttle control and said manifold pressure simulating means for deriving a potential from said source and for applying it to said conductor which varies in response to said throttle control and with the simulated manifold pressure, a balancing potentiometer for deriving a potential from said source opposite in phase to said first potential and for applying it to said conductor, a motor responsive to the summation of the potentials applied to said conductor for adjusting said balancing potentiometer until the sum of the potentials applied to said conductor becomes zero, means controlled by said motor to operate said tachometer, means for simulating a propeller governor, means for simulating the changing of the pitch of the blades of an engine driven propeller, means controlled by said governor simulating means for controlling said latter means, and means controlled by said pitch simulating means for maintaining said first potential at such a value that said tachometer will maintain an invariable reading irrespective of a change in throttle opening or a change in manifold pressure.

11. In an aircraft trainer wherein the operation of an airplane engine is simulated, a simulated throttle control, a simulated tachometer for indicating the simulated engine speed, a source of current, a control conductor, means for simulating the manifold pressure of an engine, means controlled by said throttle control and said manifold pressure simulating means for deriving a potential from said source and for applying it to said conductor which varies in response to said throttle control and with the simulated manifold pressure, a balancing potentiometer for deriving a potential from said source opposite in phase to said first potential and for applying it to said conductor, a motor responsive to the summation of the potentials applied to said conductor for adjusting said balancing potentiometer until the sum of the potentials applied to said conductor becomes zero, means controlled by said motor to operate said tachometer, means for simulating a propeller governor, means for simulating the changing of the pitch of the blades of an engine driven propeller, means controlled by said propeller governor simulating means for controlling said latter means, means controlled by said propeller pitch simulating means for maintaining said first potential at such a value that said tachometer will maintain an invariable reading irrespective of a change in throttle opening or a change in manifold pressure, and a relay operable in simulation of a failure of the propeller governor, and circuits controlled by said relay to change said first potential applied to said conductor whereby said motor is operable to cause said tachometer to show an increase in engine speed.

12. In an aircraft trainer wherein the operation of an airplane engine is simulated, a simulated throttle control, a source of current, a control conductor, means for simulating the manifold pressure of an engine, means controlled by said throttle control and said manifold pressure simulating means for deriving a potential from said source and for applying it to said conductor which varies in response to said throttle control and with the simulated manifold pressure, means operable in simulation of a propeller governor for applying a potential opposite in phase to said first potential to said conductor, a motor responsive to the summation of the potentials applied to said conductor, means controlled by said motor for varying said first potential until it balances said latter potential representative of the adjustment of the pitch of the propeller blades of an airplane in response to the operation of the propeller governor to maintain a required engine speed, a relay operable in simulation of a failure of the propeller governor, and circuits controlled by said relay to change said first potential applied to said conductor whereby said motor is operable in a direction and to a degree representative of a decrease of propeller pitch to its lowest limit.

13. In an aircraft trainer wherein the operation of an airplane engine is simulated, a simulated throttle control, a simulated tachometer for indicating the simulated engine speed, a source of current, a control conductor, means for simulating the manifold pressure of an engine, means controlled by said throttle control and said manifold pressure simulating means for deriving a potential from said source and for applying it to said conductor which varies in response to said throttle control and with simulated manifold pressure, a balancing potentiometer for deriving a potential from said source opposite in phase to said first potential and for applying it to said conductor, a motor responsive to the summation of the potentials applied to said conductor for adjusting said balancing potentiometer until the sum of the potentials applied to said conductor becomes zero, means controlled by said motor to operate said tachometer, a simulated propeller pitch control, means responsive to said control for simulating the adjustment of the pitch of the blades of a propeller, means for simulating a propeller governor, means controlled by said governor simulating means for controlling said latter means, and means controlled by said propeller pitch simulating means for maintaining said first potential at such a value that said tachometer will maintain an invariable reading irrespective of a change in throttle opening or a change in manifold pressure.

14. In an aircraft trainer wherein the operation of an airplane engine is simulated, a source of current, a control conductor, a first relay, a second relay, a simulated propeller feathering switch at the pilot's station of said trainer for operating said first relay, a timing device operable in response to the operation of said first relay for causing the operation of said second relay, said latter relay being effective to apply potential from said source to said conductor, a motor operable in response to said potential, a shaft rotatable by said motor commensurate with the simulated change of the propeller pitch, and a relay controlled by said shaft for discontinuing the application of said potential to said conductor when said shaft has rotated to simulate the change of propeller pitch to its upper limit.

15. In an aircraft trainer wherein the operation of an airplane engine is simulated, a source of current, a control conductor, a simulated propeller feathering switch at the pilot's station of said trainer, a solenoid for locking said switch in its operated position, means responsive to the operation of said switch for applying potential derived from said source to said conductor, a motor operable in response to said potential, a shaft rotatable by said motor commensurate with the simulated change of the propeller pitch, a relay controlled by said shaft for discontinuing the application of said potential to said conductor when said shaft has rotated to simulate the change of propeller pitch to its upper limit, and a relay responsive to said latter relay for releasing said solenoid to release said switch.

16. In an aircraft trainer wherein the operation of an airplane engine is simulated, a source of current, a control conductor, means for deriving potentials of opposite phase from said source and for applying them to said conductor, a motor responsive to the summation of said potentials, a shaft rotatable by said motor commensurate with the simulated change of the propeller pitch, and a relay controlled by said shaft for removing said potential and for applying ground to said conductor when said shaft has rotated in a direction and to an extent representative of the normal upper limits of the propeller pitch whereby said motor is stopped and prevented from further movement.

17. In an aircraft trainer wherein the operation of an airplane engine is simulated, a source of current, a control conductor, means for deriving variable potentials of opposite phase from said source and for applying them to said conductor, a motor responsive to the summation of said potentials, a shaft rotatable by said motor commensurate with the simulated change of the propeller pitch, a simulated propeller feathering switch at the pilot's station of said trainer, a relay responsive to the operation of said switch for connecting ground to said conductor in substitution for the variable potential of one phase and for connecting a fixed potential of the opposite phase to said conductor in substitution for the variable potential of that phase whereby said motor is operated in a manner representative of a further increase in propeller pitch, a switch operable by a cam on said shaft, and a relay by said shaft cam operated switch operable for discontinuing said latter potential and for connecting ground to said control conductor when said motor has rotated said shaft to a position to simulate the change of propeller pitch to its full upper limit.

18. In an aircraft trainer wherein the operation of an airplane engine is simulated, a source of current, a control conductor, a simulated propeller feathering switch at the pilot's station of said trainer, means responsive to a first operation of said switch for applying potential derived from said source to said conductor, a motor operable in response to said potential, a shaft rotatable by said motor commensurate with the simulated change of the propeller pitch, a switch operable by a cam on said shaft, a relay controlled by said cam operated switch for discontinuing the application of said potential to said conductor when said motor has rotated said shaft to a position to simulate the change of propeller pitch to its upper limit, and a relay operable upon the reoperation of said feathering switch and responsive to the operation of said first relay to apply a potential to said conductor opposite in phase to said first potential whereby said motor is operated in a direction representative of a decrease in propeller pitch.

19. In an aircraft trainer wherein the operation of an airplane engine is simulated, a source of current, a control conductor, means for deriving potentials from said source and for applying them to said conductor, a motor operable in one or the other direction in response to said potentials, a shaft rotatable by said motor commensurate with the simulated change of propeller pitch, a simulated propeller feathering switch at the pilot's station of said trainer, means responsive to the operation of said switch for applying potential derived from said source to said conductor whereby said motor is operable to rotate said shaft in a manner representative of an increase in propeller pitch to its upper limit, a switch operable in simulation of a failure of oil supply for the hydraulic propeller feathering motor, and a relay operable in response to the operation of said switch to disable the power circuit of said motor for preventing the response of said motor to the operation of said propeller feathering switch.

FREDERICK M. BURELBACH.
JOSEPH J. LUKACS.

REFERENCES CITED

The following references are of record in the file of this patent:

UNITED STATES PATENTS

| Number | Name | Date |
|---|---|---|
| 1,960,350 | Shackleton | May 29, 1934 |
| 2,099,857 | Lind | Nov. 23, 1937 |
| 2,218,546 | Muller | Oct. 22, 1940 |
| 2,308,566 | Noxon | Jan. 19, 1943 |
| 2,327,997 | Carmody | Aug. 31, 1943 |
| 2,332,523 | Norden | Oct. 26, 1943 |
| 2,343,945 | Weathers | Mar. 14, 1944 |
| 2,366,603 | Dehmel | Jan. 2, 1945 |
| 2,372,741 | Roberts | Apr. 3, 1945 |
| 2,395,477 | Gumley | Feb. 26, 1946 |
| 2,406,836 | Holden | Sept. 2, 1946 |
| 2,428,767 | Albert | Oct. 14, 1947 |